United States Patent
Peng et al.

(10) Patent No.: US 10,863,006 B2
(45) Date of Patent: ***Dec. 8, 2020

(54) INTERFACE GATEWAY AND METHOD OF FACILITATING COMMUNICATION BETWEEN A PROPERTY MANAGEMENT SYSTEM AND A GUEST SERVICE DEVICE

(71) Applicant: Guest Tek Interactive Entertainment Ltd., Calgary (CA)

(72) Inventors: Tsu-Kang Peng, Calgary (CA); Ellison W. Bryksa, Calgary (CA); Lea Lorenzo, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,863

(22) Filed: Oct. 22, 2019

(65) Prior Publication Data

US 2020/0053189 A1      Feb. 13, 2020

Related U.S. Application Data

(63) Continuation of application No. 15/706,358, filed on Sep. 15, 2017, now Pat. No. 10,491,714, which is a
(Continued)

(51) Int. Cl.
*H04L 29/06* (2006.01)
*H04L 12/28* (2006.01)
(Continued)

(52) U.S. Cl.
CPC .......... *H04L 69/08* (2013.01); *H04L 12/2836* (2013.01); *H04L 67/12* (2013.01);
(Continued)

(58) Field of Classification Search
None
See application file for complete search history.

(56) References Cited

U.S. PATENT DOCUMENTS 5,761,647 A    6/1998  Boushy
6,854,010 B1   2/2005  Christian et al.
(Continued)

FOREIGN PATENT DOCUMENTS

CA    2707202 C    12/2010
WO    0131885 A2   5/2001

OTHER PUBLICATIONS

American Hotel & Motel Association; "HITIS Correlation and Interface Specification," Draft Standard; Apr. 14, 2000; whole document.

(Continued)

*Primary Examiner* — Thomas J Dailey
(74) *Attorney, Agent, or Firm* — ATMAC Patent Services Ltd.; Andrew T. MacMillan

(57) ABSTRACT

An interface gateway facilitates communication between a first device and a second device serving a hospitality establishment. The first device is one of a property management system (PMS) and a guest service device, and the second device is the other of the property management system (PMS) and the guest service device. One or more communication ports perform data communications with the first device and the second device. One or more processors receive a message from the first device, determine that the message is in a first format, determine that the message is applicable to the second device, determine that the second device supports a second format, convert the message to the second format, store the message in a transmit queue with an (Continued)

indication of whether a confirmation reply is expected from the second device, and send the message in the second format to the second device.

20 Claims, 13 Drawing Sheets

Related U.S. Application Data continuation of application No. 15/254,036, filed on Sep. 1, 2016, now Pat. No. 9,800,694, which is a continuation of application No. 14/886,256, filed on Oct. 19, 2015, now Pat. No. 9,456,047, which is a continuation of application No. 13/242,883, filed on Sep. 23, 2011, now Pat. No. 9,185,178.

(51) Int. Cl.
*H04L 29/08* (2006.01)
*G06Q 50/12* (2012.01)
*G06Q 50/16* (2012.01)

(52) U.S. Cl.
CPC ......... *H04L 67/2823* (2013.01); *G06Q 50/12* (2013.01); *G06Q 50/163* (2013.01); *H04L 69/22* (2013.01)

(56) References Cited

U.S. PATENT DOCUMENTS

| 6,868,399 | B1 | 3/2005 | Short et al. |
|---|---|---|---|
| 7,310,350 | B1 | 12/2007 | Shao et al. |
| 8,190,708 | B1 | 5/2012 | Short et al. |
| 9,185,178 | B2 | 11/2015 | Peng et al. |
| 9,456,047 | B2 | 9/2016 | Peng et al. |
| 9,800,694 | B2 | 10/2017 | Peng et al. |
| 10,491,714 | B2 | 11/2019 | Peng et al. |
| 2002/0082927 | A1 | 6/2002 | Borenstein et al. |
| 2007/0005779 | A1 | 1/2007 | Yao et al. |
| 2007/0239725 | A1 | 10/2007 | Bhat et al. |
| 2010/0332615 | A1 | 12/2010 | Short et al. |
| 2012/0278494 | A1 | 11/2012 | Short et al. |

OTHER PUBLICATIONS

Worcester, Barbara A., "Interfacing Isolated Information", Hotel and Motel Management (H&MM), Apr. 6, 1998, vol. 213 Issue 6, p. 40-42.
Canadian Office action for foreign counterpart application CA 2,790,354 mailed by CIPO dated Oct. 17, 2014 (6 pages).
Comtrol, "GSS Developer Kit", copyright 2011, downloaded from http://www.comtrol.com/pub/en/gss-developer-kit on Jun. 3, 2011.
Comtrol, "Property Based PM and Lodging Link", dated Mar. 26, 2002.
Comtrol, "Lodging Link PTS", copyright 2011, downloaded from http://www.comtrol.com/pub/en/Lodging-Link-PTS on Jun. 3, 2011.
Comtrol, "Lodging Link Premier", copyright 2006.
Comtrol, "PMS Developer Kit", copyright 2011, downloaded from http://www.comtrol.com/pub/en/pms-developer-kit on Jun. 3, 2011.
Comtrol, "What is UHLL (Universal Hospitality Language Layer)?", copyright 2011, downloaded from http://www.comtrol.pub/en/What-is-UHLL on Jun. 3, 2011.
Office Action dated Aug. 18, 2015 mailed by CIPO in counterpart Canadian Patent Application No. 2,790,354 (6 pages).
American Hotel & Motel Association, "AH&MA Sanctions Mapping the HITIS Interface Protocol to XML", publication date unknown, downloaded on Dec. 4, 2012 from http://web.archive.org/web/20000817191827/http://www.hitis.org/announce-calendar/xmlmapping.htm.
Nomadix, Inc., "Statement of Defence and Counterclaim of Nomadix, Inc.", Canadian Federal Court File No. T-448-17, May 24, 2017.

Example device format table

⌐114

| Device | Communication port | IP address | Message format |
|---|---|---|---|
| PMS | Serial 1 | N/A | Format A |
| VOD controller | Wired 1 | 192.168.1.101 | Format B |
| HSIA controller | Wired 1 | 192.168.1.102 | Format C |
| Room security controller | Wired 1 | 192.168.1.103 | Format D |
| ⋮ | ⋮ | ⋮ | ⋮ |

Example cached state data

⬐—108

| Room # | Occupancy | Guest name | Special announcement | ... |
|---|---|---|---|---|
| 101 | Yes | Michael Peng | Welcome Michael | ... |
| 103 | No | N/A | N/A | ... |
| 105 | Yes | Lea Lorenzo | Complimentary breakfast now served | ... |
| 107 | Yes | Al Bryksa | Welcome Al | ... |
| 111 | No | N/A | N/A | ... |
| ⋮ | ⋮ | ⋮ | ⋮ | ⋮ |

Example message destination table  ↙—112

| Source device | Message type | Applicable destinations | Reply required |
|---|---|---|---|
| PMS | Guest_check_into_room | 1. VOD controller<br>2. HSIA controller<br>3. Room security controller<br>4. State data | Yes |
| PMS | Guest_check_out_of_room | 1. VOD controller<br>2. HSIA controller<br>3. Room security controller<br>4. State data | Yes |
| PMS | Broadcast_current_event_message | 1. State data | No |
| VOD controller | Guest_orders_in-room_pay-per-use | PMS | Yes |
| VOD controller | Room_play_free_content | PMS | No |
| HSIA controller | Guest_orders_in-room_Internet | PMS | Yes |
| Room security controller | Room-entry | PMS | No |
| ⋮ | ⋮ | ⋮ | ⋮ |

Columns: 600, 602, 604, 606

FIG. 6

Example message transmit queue  ⤺ 116

| Message | Source | Destination | Message ID | Conf. reply expected | Originally sent | Last sent | # of retries |
|---|---|---|---|---|---|---|---|
| Room 101 - checkin | PMS | VOD controller | 1004 | NO | N/A | N/A | 0 |
| Room 101 - checkin | PMS | Room control controller | 1005 | NO | N/A | N/A | 0 |
| Room 101 - checkin | PMS | HSIA controller | 1006 | NO | N/A | N/A | 0 |
| Room 105 - checkout | PMS | Cleaning staff controller | 1007 | NO | N/A | N/A | 0 |
| Room 101 - VOD ordered | VOD controller | PMS | 4358 | YES | N/A | N/A | 0 |
| Room 207 - VOD ordered | VOD controller | PMS | 321 | YES | 2011/06/01 21:55:03 | 2011/06/01 21:55:48 | 3 |
| Room 315 - door open | Room control controller | PMS | 3461 | NO | N/A | N/A | 0 |
| Room 401 - Guest name: John Doe | PMS (cached) | VOD controller | 341 | NO | N/A | N/A | 0 |
| ⋮ | ⋮ | ⋮ | ⋮ | ⋮ | ⋮ | ⋮ | ⋮ |

FIG. 7

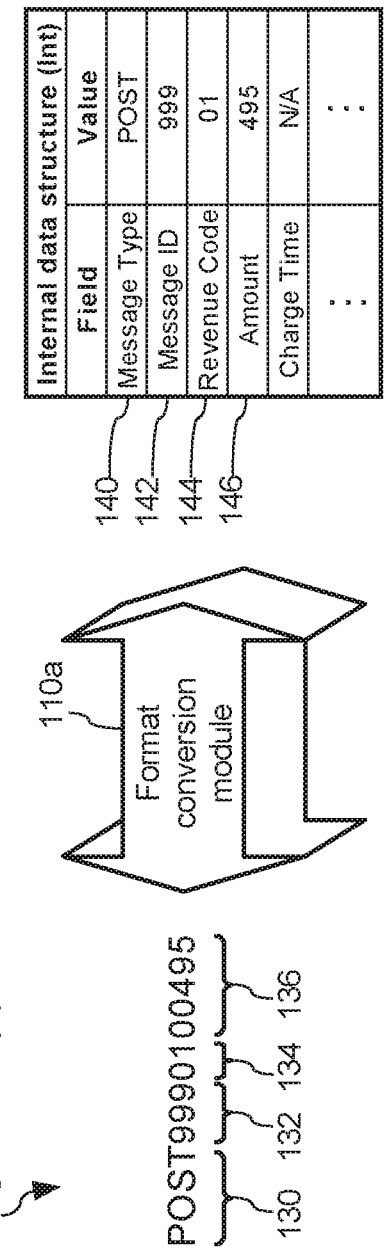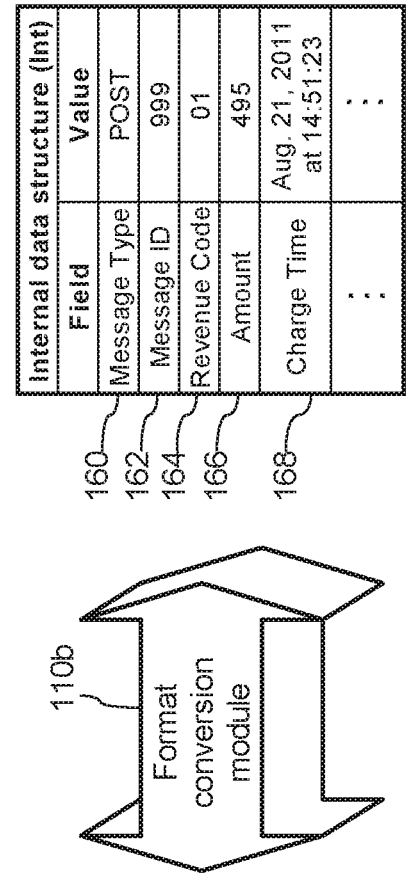
FIG. 13

INTERFACE GATEWAY AND METHOD OF FACILITATING COMMUNICATION BETWEEN A PROPERTY MANAGEMENT SYSTEM AND A GUEST SERVICE DEVICE

CROSS-REFERENCE TO RELATED APPLICATIONS

This application is a continuation of U.S. patent application Ser. No. 15/706,358 filed on Sep. 15, 2017; which is a continuation of U.S. patent application Ser. No. 15/254,036 filed on Sep. 1, 2016, which is a continuation of U.S. patent application Ser. No. 14/886,256 filed on Oct. 19, 2015, which is a continuation of U.S. patent application Ser. No. 13/242,883 filed on Sep. 23, 2011. All of these applications are incorporated herein by reference.

BACKGROUND OF THE INVENTION

(1) Field of the Invention

The invention pertains generally to property management systems and guest service devices serving hospitality establishments such as hotels and resorts. More particularly, the invention relates to interfacing property management systems with guest service devices.

(2) Description of the Related Art

Hospitality establishments such as hotels and resorts commonly use a computerized property management system (PMS) to manage guest bookings, online reservations, point-of-sale terminals, telephone, and other amenities. For example, front desk staff may be provided with a computer terminal connected to the PMS allowing staff members to view room status and check-in guests to vacant rooms. Automatic interaction with the PMS by guest service devices is also useful. In one example, when a guest makes a long distance phone call using an in-room telephone, the hotel's telephone system automatically posts a charge to the guest's room by sending a room charge message to the hotel's PMS. The telephone charge is thereby automatically added to the guest's folio.

A PMS is typically a standalone device having a limited number of communication interfaces to help secure sensitive data stored therein. The communication interfaces allow external guest service devices to access information stored within the PMS by sending and receiving messages to and from the PMS via a communication interface. The PMS may also send notification messages to guest service devices via the communication interfaces. A serial port is often included as one of the interfaces to allow interconnection to a guest service device such as a controller of the above-described telephone system. A plurality of serial ports for connecting to multiple guest service devices may be included, for example, allowing simultaneous connections to a telephone system controller, an electronic door access controller, a minibar door access controller, a video-on-demand (VOD) controller, a high speed internet access (HSIA) controller, etc. One or more network ports may also be included as communication interfaces in order to allow the PMS to communicate with any number of external guest service devices via a computer network.

Different PMSs and different guest service devices often utilize incompatible proprietary formats when sending and receiving messages via their respective communication interfaces. For example, a first PMS from a first vendor may require a post-room-charge message sent by a guest service device to be in a certain format, while a second PMS from a second vendor may require the same message to be in another format. Likewise, a first guest service device may expect to receive a message containing room information from the PMS in a particular format, while another guest service device from a different vendor may expect to receive the same information from the PMS in a different message format. Different message formats may involve different message sizes, data fields, authentications, encoding techniques, compression, message segmentation, acknowledgements, checksums, and failure notification requirements, for example.

Due to the substantial numbers of vendors providing PMS and guest service systems in the hospitality industry and no accepted standard messaging format, communication incompatibilities between different vendor components is a common problem. These incompatibilities increase the costs related to component integration. For example, guest service system vendors often need to custom modify their systems to support a specific message format in use by a PMS currently installed at a customer's hotel. Significant costs are incurred each time a guest service system vendor has to make modifications to support a new PMS message format. The reverse problem of a PMS vendor having to modify their PMS product to support of any of hundreds of different proprietary guest service system message formats is equally costly.

Hospitality establishments themselves also suffer from the above-described message format incompatibilities. For example, after a hotel installs a particular guest service system such as VOD, if the hotel decides to change to a new type of PMS requiring messages in a different format, a controller of the already-installed VOD system may need to be modified to support the new PMS messaging format. Furthermore, when a hotel has many different guest service systems installed from different vendors, the hotel may be required to pay fees to each guest service system vendor to support the new PMS messaging format.

One attempt to solve these message format incompatibility problems is the Lodging Link® product suite offered by Comtrol®. Comtrol's solution requires PMS vendors to implement Control's proprietary and exclusive universal hospitality language layer (UHLL) to thereby enable the PMS to communicate with hundreds of different vendors' guest service devices via the Lodging Link product.

However, in order to benefit from the Lodging Link product, a PMS vendor must still expend effort and cost ensuring their PMS is properly UHLL-compliant. Additionally, from a hotel's point of view, vendor choice is limited because not all PMSs are UHLL-compliant and not all guest service systems are supported by the Lodging Link product suite. Furthermore, once a hotel invests in a UHLL-compliant PMS and guest service systems supported by the Lodging Link product, it may be very costly for the hotel to switch to a non-UHLL-compliant PMS or utilize an unsupported guest service system. For example, after switching to a non-UHLL-compliant PMS, the hotel may need to pay substantial vendor fees to have either the non-UHLL-compliant PMS or the already-installed guest service systems (or both) modified to support a new message format such as the UHLL.

BRIEF SUMMARY OF THE INVENTION

According to an exemplary configuration of the invention there is provided an interface gateway for interfacing between at least a first device and a second device serving a hospitality establishment. The first device is one of a property management system (PMS) and a guest service device installed locally at the hospitality establishment, and the second device is the other of the property management system (PMS) and the guest service device installed locally at the hospitality establishment. The interface gateway includes one or more communication ports coupled to the Internet for communicating via the Internet with the first device and the second device. A storage device stores a plurality of software instructions. One or more processors are coupled to the storage device and the communication port. By the one or more processors executing the software instructions loaded from the storage device, the one or more processors are operable to receive a message via the one or more communication ports from the first device, determine that the message is in a first format, convert the message from the first format to an internal data structure, parse the message in the internal data structure to determine that the message is applicable to the second device, determine that the second device supports a second format, convert the message from the internal data structure to the second format, and send the message in the second format to the second device via the one or more communication ports.

According to another exemplary configuration of the invention there is provided a method of interfacing between at least a first device and a second device serving a hospitality establishment. The first device is one of a property management system (PMS) and a guest service device installed locally at the hospitality establishment, and the second device being the other of the property management system (PMS) and the guest service device installed locally at the hospitality establishment. The method includes receiving a message via the Internet from the first device, determining that the message is in a first format, converting the message from the first format to an internal data structure, parsing the message in the internal data structure to determine that the message is applicable to the second device, determining that the second device supports a second format, converting the message from the internal data structure to the second format, and sending the message in the second format to the second device via the Internet.

According to yet another exemplary configuration of the invention there is provided an interface gateway for interfacing between at least a first device and a second device serving a hospitality establishment. The first device being one of a property management system (PMS) and a guest service device, and the second device being the other of the property management system (PMS) and the guest service device. The interface gateway includes means for receiving a message from the first device, means for determining that the message is in a first format, means for converting the message from the first format to an internal data structure, means for parsing the message in the internal data structure to determine that the message is applicable to the second device, means for determining that the second device supports a second format, means for converting the message from the internal data structure to the second format, and means for sending the message in the second format to the second device.

According to yet another exemplary configuration of the invention there is provided an interface gateway for facilitating communication between a first device and a second device serving a hospitality establishment. The first device being one of a property management system (PMS) and a guest service device, and the second device being the other of the property management system (PMS) and the guest service device. The interface gateway includes one or more communication ports for communicating with the first device and the second device, a storage device for storing a plurality of software instructions utilized by the interface gateway in facilitating communication between the first device and the second device, and one or more processors coupled to the storage device and the one or more communication ports. By the one or more processors executing the software instructions from the storage device, the one or more processors are operable to receive a message from the first device via the one or more communication ports, determine that the message is in the first message format supported by the first device, convert the message from the first message format into an internal data structure utilized by the interface gateway, parse the message in the internal data structure to determine that the message is designated for the second device, convert the message from the internal structure into a second message format supported by the second device, store the message in the second message format as an outgoing message in a transmit queue, wherein the transmit queue stores one or more outgoing messages and a respective indication of whether the interface gateway is expected to receive a confirmation reply from a destination device to which the outgoing message is associated, and send the message in the second message format from the transmit queue to the second device.

According to yet another exemplary configuration of the invention there is provided a method of facilitating communication between at least a first device and a second device serving a hospitality establishment. The first device being one of a property management system (PMS) and a guest service device that is configured to support a first message format, and the second device being the other of the property management system (PMS) and the guest service device that is configured to support a second message format. The method is performed by an interface gateway that utilizes an internal data structure. The method includes storing in a storage device information regarding the first message format and the second message format, receiving a message from the first device, determining that the message is in the first message format supported by the first device, converting the message from the first message format into the internal data structure, detecting that the message is designated for the second device, determining that the second device supports the second message format, converting the message from the internal data structure into the second message format, storing the message in the second message format as an outgoing message in a transmit queue, wherein the transmit queue stores one or more outgoing messages and a respective indication of whether the interface gateway is expected to receive a confirmation reply from a destination device to which the outgoing message is associated, and sending the message in the second message format from the transmit queue to the second device.

These and other embodiments and advantages of the invention will become apparent from the following detailed description, taken in conjunction with the accompanying drawings, illustrating by way of example principles of the invention.

BRIEF DESCRIPTION OF THE DRAWINGS

The invention will be described in greater detail with reference to the accompanying drawings which represent preferred embodiments thereof.

FIG. 4 illustrates an example of the device format table of FIG. 1.

FIG. 5 illustrates an example of the cached state data of FIG. 1.

FIG. 6 illustrates an example of the message destination table of FIG. 1.

FIG. 7 illustrates an example of the transmit queue of FIG. 1.

FIG. 13 illustrates how format conversion modules of FIG. 1 allow the interface gateway to convert a message between an external message format and the internal data structure.

DETAILED DESCRIPTION

Figure 1:
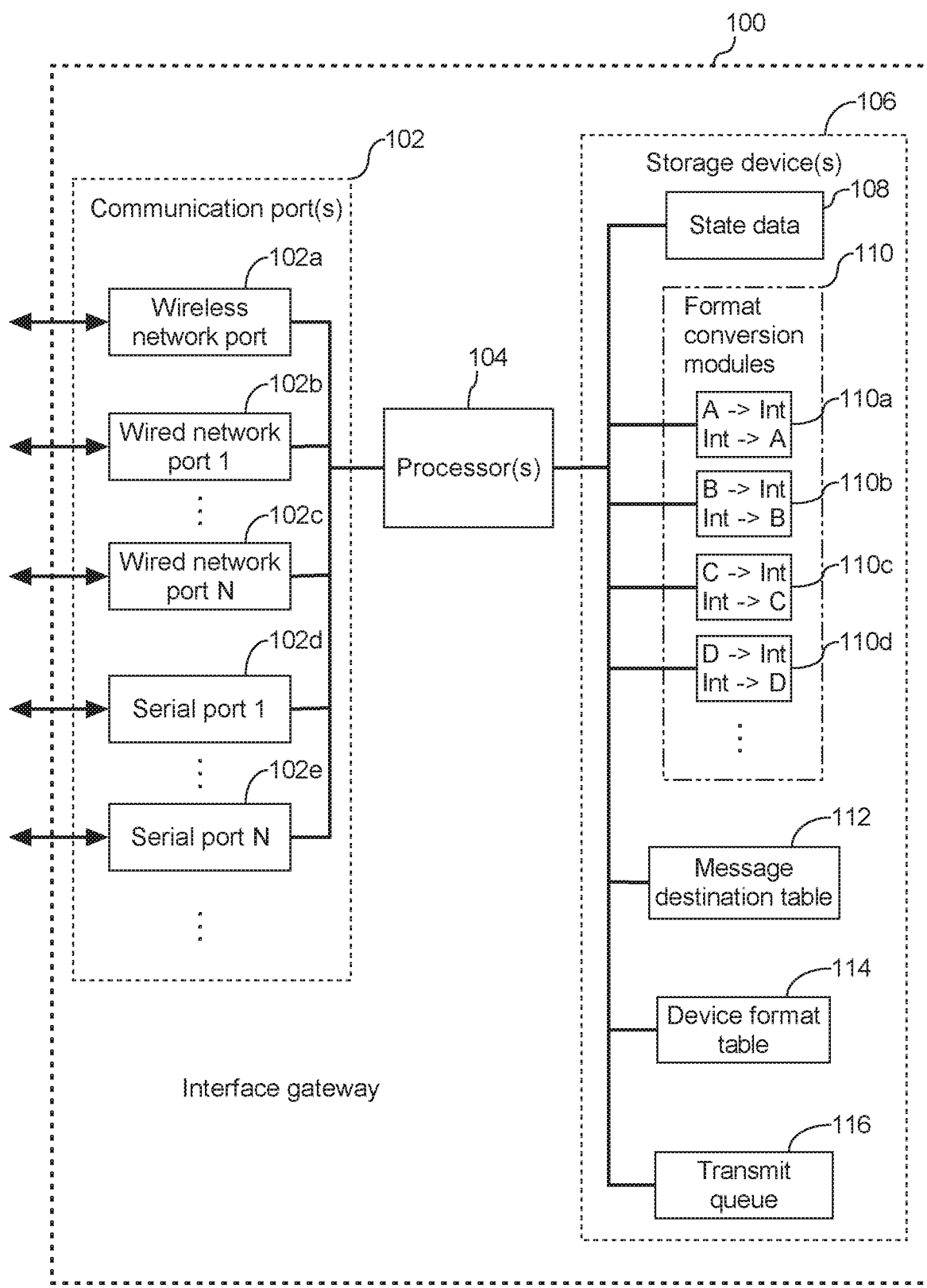
FIG. 1 is a block diagram of an interface gateway according to an exemplary configuration of the invention.

FIG. 1 is a block diagram of an interface gateway 100 according to an exemplary configuration of the invention. In this configuration, the interface gateway 100 includes communication ports 102 including a wireless network port 102a; a plurality of wired networks ports 102b, 102c; and a plurality of serial ports 102d, 102e. The communication ports 102 perform data communications with attached devices such as a hotel's property management system (PMS) and one or more guest service devices that require access to the PMS. Different devices may be attached to different communication ports 102 or a single communication port 110 may perform data communications with two or more devices such as when both a PMS and a guest service device are attached via a wireless or wired network port 102a, 102b, 102c, for example.

One or more processors 104 coupled to the communication ports 102 send and receive messages to and from the attached devices via the communication ports 102. A storage device 106 is coupled to the processors 104 for storing state data 108, a number of format conversion modules 110, a message destination table 112, a device format table 114, and a transmit queue 116.

In this configuration, each of the format conversion modules 110 is an updatable software module comprising rules and/or instructions that when utilized (e.g., executed) by the processors 104 allows the processors 104 to convert messages between a particular external message format and an internal data structure (Int) utilized by the interface gateway 100.

For example, the interface gateway 100 includes a first format conversion module 110a allowing the processors 104 to convert messages between a first format (A) and the internal data structure (Int). Specifically, the first format conversion module 110a allows the processors 104 to convert messages from the first format (A) to the internal data structure (Int), and to convert messages represented using the internal data structure (Int) to the first format (A). Likewise, second, third and fourth format conversion modules 110b, 110c, 110d respectively allow the processors 104 to convert messages between second, third, and fourth formats (B, C, D) and the internal data structure (Int). Additional or fewer format conversion modules 110 may be used in other configurations, and the specific format conversion modules 110 stored in the storage device 106 may be dynamically updated at any time.

To use the interface gateway 100 in conjunction with a particular hospitality establishment, the message formats A, B, C, D, etc. of the format conversion modules 110 installed in the storage device 106 are selected to correspond to each of the specific message formats utilized by attached devices in use at the hospitality establishment such as a PMS and one or more guest service devices.

For example, an attached HSIA controller coupled to one of the communication ports 102 may send and receive messages in a proprietary format such that utilized by the One View Internet™ product offered by Guest Tek Interactive Entertainment Ltd. In this case, one of the format conversion modules 110 installed in the storage device 106 is directed to this proprietary format. Other arbitrary message formats may also be utilized by different attached vendor components according to each component's specific design and interface capabilities. The above-mentioned proprietary UHLL by Comtrol® is another example of a message format that may be employed by a PMS and/or guest service device coupled to one or more of the communication ports 102. For each different message format utilized by an attached device, a corresponding format conversion module 110 directed at that message format is stored in the storage device 106.

In some cases, two or more attached devices may utilize a same message format; in this case, one of the format conversion modules 110 stored in the storage device 106 is directed at this common message format and messages to and from each of these devices are converted into and out of the internal data structure (Int) by this same format conversion module 110.

The internal data structure (Int) includes a generalized set of fields that may be required to process messages by different attached devices, and the interface gateway 100 natively processes received messages and generates outgoing messages according to the internal data structure (Int). The processors 104 utilize the appropriate format conversion modules 110 to get the messages into and out of the internal data structure (Int) depending on the specific format required by the attached source and destination device(s).

FIG. 13 illustrates how format conversion modules 110 of FIG. 1 allow the interface gateway 100 to convert a message between a respective message format and the internal data structure (Int). The messages of FIG. 13 are meant as examples to help with an understanding of converting between messages in external message formats and the internet data structure (Int); however, the invention is not limited to just these examples.

As shown in the upper part of the diagram, by using a first format conversion module 110a, the processors 104 are able to convert between a post-room-charge message in a first message format (A) and the same message in the internet data structure (Int). In this example, the first format conversion module 110a contains rules that allow the processors 104 to convert between the various characters 130, 132, 134, 136 of the message expressed in format (A) and the corresponding fields 140, 142, 144, 146 of the internal data structure (Int) according to character positions in the message.

In particular, the first format conversion module 110a includes rules that the message type 140 is expressed by the first four characters 130, the message ID 142 is expressed by the next three characters 132, the revenue code 144 is expressed by the next two characters 134, and the amount 146 is expressed by the final five characters 136. Some fields of the internal data structure (Int) are not applicable to the first format (A) such as the "Charge time" field, which may occur when using a message format that is not capable of or required to include all fields of the internal data structure (Int). When converting from the internal data structure (Int) to the first format (A) in this example, these non-applicable fields are ignored by the first format conversion module 110a.

In the lower part of the diagram, by using a second format conversion module 110b, the processors 104 are able to convert between a post-room-charge message expressed in a second message format (B) and the same message in the internal data structure (Int). In this example, the second format conversion module 110b contains rules that allow the processors 104 to convert the first two characters 150 between the message type field 160, and to convert the remaining characters 152, 154, 156, 158, 159 of the message between their corresponding fields 162, 164, 166, 168 of the internal data structure (Int) according to field codes and delimiters in the message.

In particular, the second format conversion module 110b includes rules that the message type 160 is expressed by the first two characters 150, the message ID 162 is expressed by the characters 152 between "ID" and any following delimiter "|", the revenue code 164 is expressed by the characters 154 between "RC" and any following delimiter "|", the amount 166 is expressed by the characters 156 between "AM" and any following delimiter "|", the date portion of the charge time 168 is expressed by the characters 158 between "DA" and any following delimiter "|", and the time portion of the charge time 168 is expressed by the characters 159 between "TI" and any following delimiter "|" (of which there is no following delimiter in this example). Because the second format (B) in this example is more sophisticated than the first format (A), additional fields of the internal data structure (Int) such as the charge time 168 may now be utilized when sending/receiving messages to attached devices using this format (B).

Different message types may be converted by the format conversion modules 110 in a similar way. For example, each format conversion module 110 may include additional rules to handle conversion between other fields of the internal data structure (Int) used by other exemplary message types such as "LOOK", "START", "DATABASE UPDATE", "TEST", "VERIFY", "ERROR", "CHECK-IN", "CHECK-OUT" in addition to (or instead of) the "POST" message type illustrated in FIG. 13. Any other proprietary or application-specific message types may also be supported such as room announcement messages for VOD. The message types supported by each format conversion module 110 may be selected according to the specific message types supported by the message format to which each format conversion module 110 is directed and/or the specific devices attached to the interface gateway 100.

A beneficial feature of the exemplary interface gateway 100 of FIG. 1 involves the ability to convert between different message formats A, B, C, D so that guest service devices can communicate with a PMS and vice versa without requiring either the PMS vendor or the guest service device vendors to support a specific message format. The conversion between different message formats is advantageously performed by the interface gateway 100 utilizing a two-step process, including: 1) converting from a determined source format utilized by the source device to the internal data structure (Int), and 2) converting from the internal data structure (Int) to a determined destination format supported by the destination device.

Another beneficial feature of the interface gateway 100 involves the ability to process received messages after they are converted to the internal data structure (Int) and to automatically generate new messages in the internal data structure (Int) as required. Because the interface gateway 100 is designed to operate according to the internal data structure (Int), the operation of the interface gateway 100 may be rigorously tested and confirmed correct with respect to messages represented in the internal data structure (Int). After confirming core operations function correctly according to messages represented in the internal data structure (Int), testing and confirmation of each format conversion module 100 may be conducted at subsequent stage(s) as required. In this way, verification of the interface gateway 100 is greatly facilitated by the employment of the two-step conversion process.

Yet another beneficial feature of the interface gateway 100 involves the ability to dynamically update the format conversion modules 110 stored in the storage device 106 after deployment. For example, adding a new conversion module 110 for handling converting between a new message format and the internal data structure (Int) thereby allows the interface gateway 100 to interface newly attached devices using the new message format with the previously attached devices using other incompatible message formats. The interface gateway 100 natively "understands" the internal data structure (Int) and has already been rigorously tested and confirmed to properly process messages in the internal data structure (Int). Adding a new format conversion module 110 to convert between the new message format and the internal data structure (Int) allows the interface gateway 100 to get messages into and out of the internal data structure (Int). Updating the installed format conversion modules 110 is particularly beneficial to allow a hotel or other hospitality establishment to cost-effectively integrate different vendor components having incompatible message formats without requiring any vendor to support a particular message format. Because the format conversion modules 110 (and other configuration tables stored in the storage device 106 such as the message destination table 112 and device format table 114) may be updated at any time, the hospitality establishment further benefits from the freedom to use vendor components having incompatible message formats both when initially purchasing components and during future expansions and enhancements.

Several practical applications and examples to help illustrate these and other beneficial features of the interface gateway 100 are provided in the following figures and accompanying description.

Figure 2:
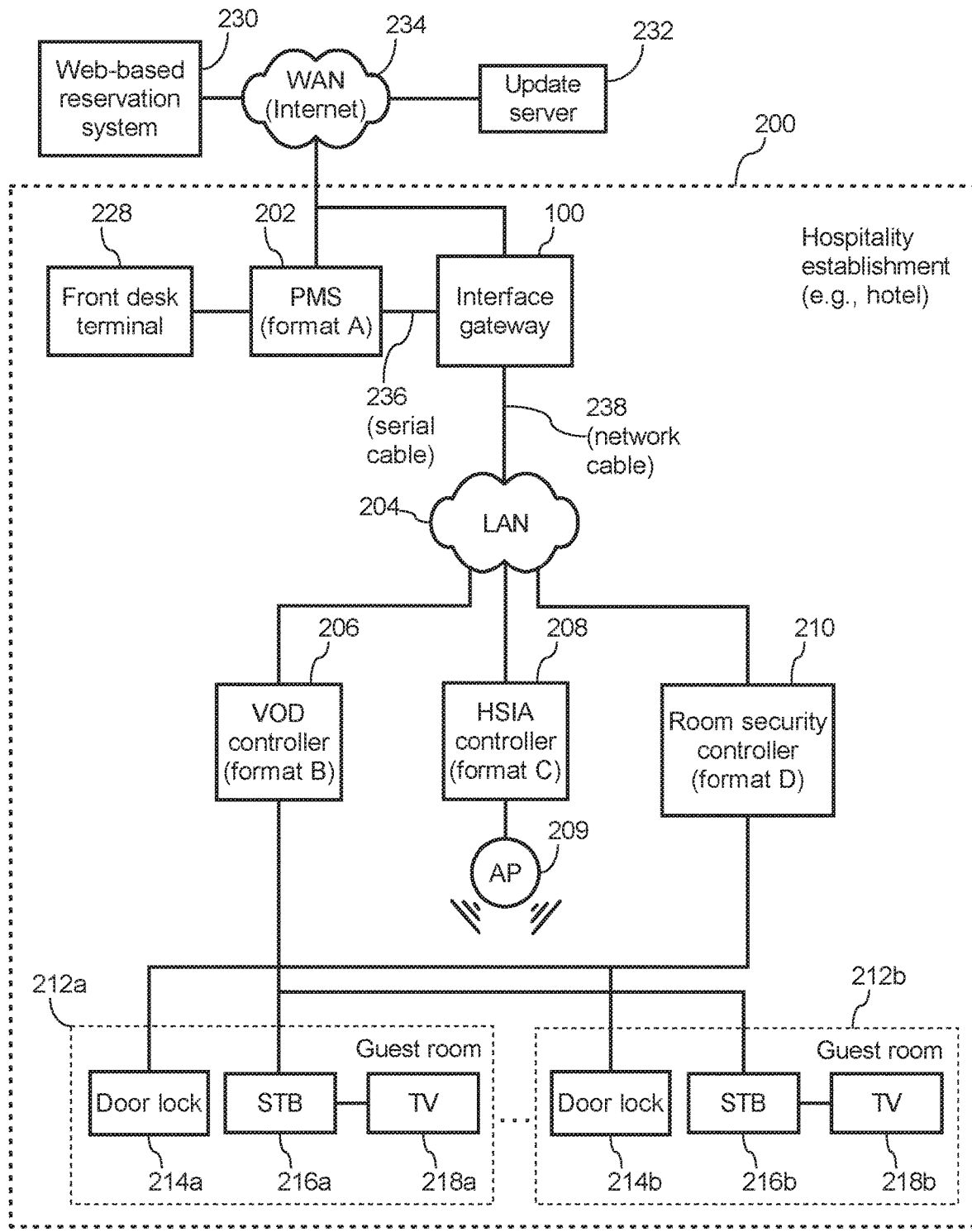
FIG. 2 is a system diagram illustrating a beneficial application of the interface gateway of FIG. 1 at a hospitality establishment according to an exemplary configuration of the invention.

FIG. 2 is a system diagram illustrating a beneficial application of the interface gateway 100 of FIG. 1 at a hospitality establishment 200 according to an exemplary configuration of the invention. In this configuration, the hospitality establishment 200 includes the interface gateway 100, a PMS 202, a local area network (LAN) 204, and a plurality of guest service devices including a video-on-demand (VOD) controller 206, a high speed Internet access (HSIA) controller 208, and a room security controller 210. Other types and numbers of guest service devices may also be coupled to the interface gateway 100 in other configurations according to application-specific requirements of the target hospitality establishment 200.

In this example, one or more access points (APs) 209 are coupled to the HSIA controller 208 for providing wireless Internet access from within a plurality of guest rooms 212. Each guest room 212a, 212b respectively includes an electronic door lock 214a, 214b coupled to the room security controller 210; a set-top box (STB) 216a, 216b coupled to the VOD controller 206; and a television (TV) 218a, 218b coupled to the in-room STB 216a, 216b.

Hotel employees interact with the PMS 202 utilizing a front desk terminal 228. Additionally, guest reservations are received from a web-based reservation system 230 via a wide area network (WAN) such as the Internet 234 connected to the hospitality establishment 200. An update server 232 is coupled to the interface gateway 100 via the WAN 234 to allow remote updates to the format conversion modules 110 and other tables 112, 114 installed in the interface gateway 100. Updating the format conversion modules 110 may include modifying an existing format conversion module 110, deleting an existing format conversion module 110, replacing an existing format conversion module 110, and/or adding a new format conversion module 110, for example. The message destination table 112 and the device format table 114 may also be updated by the update server 232 at any time such as when a new format conversion module 110 is installed. The update server 232 is located offsite in this example to allow the interface gateway 100 to be remotely updated; however, in other configurations, the update server 232 may also be located within the hospitality establishment 200.

For illustration purposes, the PMS 202 in this example is shown operating with a first message format (A), the VOD controller 206 is shown operating with a second message format (B), the HSIA controller 208 is shown operating with a third message format (C), and the room security controller 210 is shown operating with a fourth message format (D). In this example, the message formats A, B, C, D are assumed to be different and incompatible. The PMS 202 is coupled to the interface gateway 100 using a serial cable 236, which is connected to a serial port 110d, 110e of the interface gateway 100. The VOD controller 206, the HSIA controller 208, and the room security controller 210 are coupled to the interface gateway 100 using a network cable 238, which is connected to a wired network port 110b, 110c of the interface gateway 100. Other connections of such devices 202, 206, 208, 210 to the interface gateway 100 may be utilized in other configurations.

There may also be other components and interconnections in use at the hospitality property 200 such as a firewall (not shown) to provide security when coupling the Internet 234 to the LAN 204. As these components are well-known and not necessary to describe the interface gateway 100 they are omitted herein for simplicity.

Figure 3:
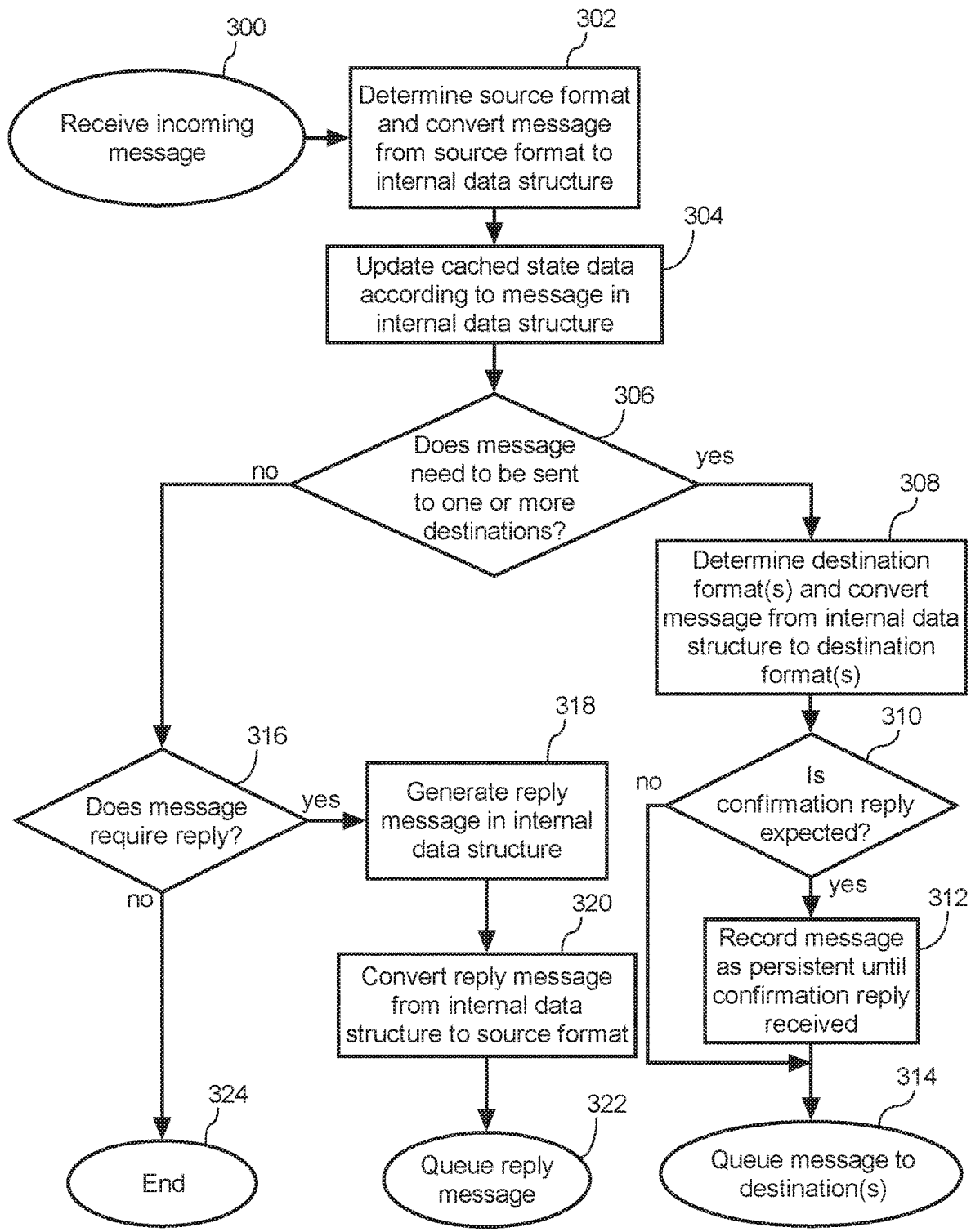
FIG. 3 is a flowchart describing exemplary operations performed by the interface gateway of FIG. 1 when processing a received message.

FIG. 3 is a flowchart describing exemplary operations performed by the interface gateway 100 when processing a received message. The steps of the flowchart are not restricted to the exact order shown, and, in other configurations, shown steps may be omitted or other intermediate steps added. As shown in FIG. 1, the interface gateway 100 includes one or more processors 104, and the one or more processors 104 are configured in this example by executing software instructions loaded from a storage medium (not shown) to thereby cause the interface gateway 100 to perform the steps of FIG. 3. In some configurations a single processor 104 may be utilized; however, in the following description a plurality of processors 104 operate together such as in a dual or quad-core central processing unit (CPU).

The process begins at step 300 when the interface gateway 100 receives an incoming message from a first attached device, referred to hereinafter as the source device. The source device may be the PMS 202 or any of the guest service devices 206, 208, 210 of FIG. 2, and the message is in the specific message format utilized by the source device. As shown in FIG. 2, when the message originates from the PMS 202 the message will be in the first format (A), when originating from the VOD controller 206 it will be in the second format (B), when originating from the HSIA controller 208 it will be in the third format (C), and when originating from the room security controller 210 it will be in the fourth format (D).

At step 302, the processors 104 of the interface gateway 100 utilize the appropriate format conversion module 110 to convert the message from the source format to the internal data structure (Int). For example, assuming the processors 104 receive a room check-in notification message originating from the PMS 202 via the one or more communication ports 102, the processors 104 utilize the first format conversion module 110a to convert the first message from the format (A) utilized by the PMS 202 to the internal data structure (Int) utilized by the interface gateway 100. Prior to performing the conversion, this step involves the processors 104 determining the source format in order to select the appropriate format conversion module 110. The processors 104 may automatically detect the format of the received message and thereby select the appropriate format conversion module 110 such as by scanning for a format-type designator included in the message. Because not all message formats will include such an easily recognizable designator, in this configuration, the processors 104 utilize a combination of the connection port 102 on which the message was received and/or a source address of the message to determine the source device and look up the source format type in the device format table 114. The source IP address (or another address such as a source MAC address) may be included in the message itself or more likely may be included in a packet or frame containing the message as passed across a computer network 238 or serial cable 236.

FIG. 4 illustrates an example of the device format table 114. A purpose of the device format table 115 is to store message format type settings allowing the processors 104 to determine the message format utilized by each of the various attached devices 202, 206, 208, 210. In this example, the device format table 114 stores rows of information for each attached device having columns of data as follows:

Column 400—Device: Stores the device identifier of the attached device. For illustration purposes the devices are identified by a descriptive name; however, in other configurations, other types of device identifiers may be utilized such as a media access control (MAC) address, unique serial numbers, etc.

Column 402—Communication port: Stores an indication of the communication port 102 to which the device is attached. Messages received from and sent to the device specified in column 400 utilize this port.

Column 404—Internet Protocol (IP) address: Stores the IP address of the device on the hospitality establishment's LAN 204. In other examples, the IP address may be a public IP address when the device is located on the Internet. This column may not apply to devices connected to a serial port. Alternatively, devices connected to a serial port may have another type of address stored in this column being applicable to a serial interface standard.

Column 406—Message format: Stores an indication of the message format type utilized by the device. The format types A, B, C, D listed in this column respectively correspond to the different format conversion modules 110a, 110b, 110c, 110d illustrated in FIG. 1. In this way, the value of column 606 informs the processors 104 of which format conversion module 110 to utilize when converting a message received from the attached device into the internal data structure (Int), and when converting a message from the internal data structure (Int) for transmission to the device.

Continuing the description of FIG. 3, at step 304 the interface gateway 100 parses the received message in the internal data structure (Int) and updates state data 108 stored in the storage device 106 according to the message. This step may involve the processors 104 performing actions such as caching information contained in the message, updating statistics related to the type or content of the message, and/or clearing pending messages in the transmit queue 116 that have now received a required confirmation reply. Continuing the above example of the room check-in notification message received from the PMS 202, the processors 104 at this step parse the message in the internal data structure to determine that the first message includes new PMS data corresponding to the room check-in. The state data 108 in the storage device 106 is thereafter updated according to this new PMS data.

FIG. 5 illustrates an example of cached state data 108. In this example, the state data 108 corresponds to a cached version of data stored at the PMS 202. The state data 108 may be a complete set of the data stored at the PMS 202; however, in this example, the state data 108 only includes a cached subset of the data stored at the PMS 202 including fields that may be required by one or more of the attached guest service devices 206, 208, 210. The state data 108 in this example is organized as a table including rows corresponding to room numbers and columns storing state data related to each room including:

Column 500—Room number: Stores the room identifier such as the guest room number to which this row in the state data 108 corresponds. Other types of room identifiers such as room names or locations may also be utilized in other configurations, for example.

Column 502—Occupancy: Stores the occupancy state of the room.

Column 504—Guest name: Stores the name of the guest staying in the room when the room is occupied or not applicable "N/A" when the room is not occupied.

Column 506—Special announcement: Stores a room-specific special announcement to be displayed on a home page menu of the in-room TV 218 by the STB 216 or not applicable "N/A" when the room is not occupied.

Continuing the description of FIG. 3, at step 304 assuming the message received from the PMS and parsed by the processors 104 in the internal data structure (Int) is found to be a notification message including new PMS data specifying that a guest is now checked in to a previously vacant room and including the guest's name, the processors 104 find the row in the state data 108 corresponding to the room and update the "Occupancy" and "Guest name" columns 502, 504 according to new PMS data (e.g., new occupancy status and guest name) included in the message. It should also be noted that although the state data 108 in this example stores a cached version of data stored at the PMS 202, the state data 108 may also store a cached version of data stored at any attached devices, for example, the PMS 202, VOD controller 206, HSIA controller 208, and/or room security controller 210. In general, the processors 104 parse the received message after it has been converted to the internal data structure (Int) to determine new data included in the message, and update the state data 108 in the storage device 106 according to the new data.

At step 306, the processors 104 determine whether the message needs to be sent to a second attached device, referred to hereinafter as a destination device. Some messages received at the gateway 102 may be applicable to both a second attached device and a third attached device (or more), referred to hereinafter as destination devices. By parsing the received message after it is converted to the internal data structure (Int), the interface gateway 100 may determine that the message is applicable to one or more destination device(s). For example, after converting a message originating from the PMS 202 to the internal data structure (Int), the processors 104 may parse the message in the internal data structure (Int) to determine the type of message and to then determine that that type of message is applicable to one or more of the guest service devices 206, 208, 210. In order to determine which types of messages are applicable to other devices, the processors 104 may refer to the message destination table 112.

FIG. 6 illustrates an example of the message destination table 112. As illustrated, different types of incoming messages from the various attached devices 202, 206, 208, 210 coupled to the interface gateway 100 are applicable to one or more destinations. After conversion of a received message to the internal data structure (Int) at step 302, the processors 104 determine whether the received message is applicable to other destination devices according to the message destination table 112. In this example, the message destination table 112 stores rows of information corresponding to message types having columns of data as follows:

Column 600—Source device: Stores an identifier of the source device. For illustration purposes the source devices are identified by a descriptive name; however, in other configurations, other types of source identifiers may be utilized such as the device's IP or MAC address, unique identifier, etc.

Column 602—Message type: Stores an identifier of the message type. Although descriptive strings are used to illustrate the different message types in this example, the message types stored in this column may actually correspond to another proprietary value passed along with the message to indicate its type. The different message type values may be specified according to the specific message formats A, B, C, D, each of which having a respective format conversion module 110 installed in the storage device 106, for example. Specific message-type codes included in the messages may be converted to a same message type field by different format conversion modules 110. For example, with reference to FIG. 13, a first format (A) may include a message-type code 130 (e.g., value="POST") corresponding to a "POST" message type 140 in the internal data structure (Int). Likewise, a second format (B) may include a message-type code 150 (e.g., value="PS"), which also corresponds to the "POST" message type 140 in the internal data structure (Int).

Column 604—Applicable destinations: Stores a list of destination device(s) to which the message is applicable. In this example, the state data 108 is also included as an applicable destination for certain types of messages received from the PMS 202. In this way, messages from the PMS 202 having an applicable destination(s) including "state data" in column 604 are deemed to include new PMS data at step 304 of FIG. 3.

Column 606—Reply required: Stores an indication of whether a reply from each of the applicable destinations indicated in column 604 is required. A reply may be required when it is important that the message be received by the applicable destination such as when billing or security aspects are involved. Alternatively, no reply may be required when the message simply involves information or notifications sent for non-critical purposes such as routine statistics or logging, for example. Additionally, in this example, the "Reply required" column 506 does not apply to the state data 108 since the interface gateway 100 may itself automatically confirm that the state data 108 is property updated when storing the new PMS data.

By parsing the received message in the internal data structure (Int) to determine the message type and then searching the message destination table 112 to find the row corresponding to that message type, the processors 104 may determine whether the message is applicable to another device. In this way, the processors 104 determine that the above-described PMS notification message ("Guest_check_into_room") is firstly applicable to the VOD controller 206. This may be so that the VOD controller 206 will, upon guest check-in, unlock the ability for the in-room STB 216 to order pay-per-use VOD in the room 212. In this example, the same PMS notification message is also applicable to the HSIA controller 208 in order to activate Internet access in the room upon guest check-in, and the room security controller 210 to change the room's electronic door key card code upon guest check-in, for example.

Alternatively, some messages received at the gateway 102 may not be applicable to other devices. For example, a broadcast message from the PMS 202 to indicate a current event ("Broadcast_current_event message") may simply be stored in the state data 108 without being directly applicable to any of the guest service devices 206, 208, 210. This may be beneficial, for example, when the VOD controller 206 is already programmed to periodically query the PMS 202 for current event messages. In this case, because the interface gateway 100 has cached the current event message in the state data 108, the interface gateway 100 may reply to the VOD controller 206 on behalf of the PMS 202 according to the cached data state data 108. In this way, requests from the VOD controller 206 to the PMS 202 may be handled by the interface gateway 100, which thereby reduces the load on the PMS 202. Reducing load on the PMS 202 further reducing data traffic to/from the PMS 202, which is especially beneficial when the PMS 202 is connected to other devices using a slow speed serial cable 236.

Continuing the description of step 306 of FIG. 3, when the received message is applicable to one or more destination devices, control proceeds to step 308; otherwise, control proceeds to step 316.

At step 308, for each applicable destination device and according to the message format of the applicable destination device as specified in the device format table 114, the processors 104 convert the message from the internal data structure (Int) to the appropriate destination format. The processors 104 may determine that a destination device supports a particular format by looking up the message format type utilized by the destination device in the device format table 114 stored in the storage device 106 prior to converting the message from the internal data structure to the destination format.

Continuing the above example of a PMS room check-in notification message "Guest_check_into_room", in addition to storing the new PMS data in the state data 108, the processors 104 utilize the second format conversion module 110b to convert the notification message from the internal data structure (Int) to the second format (B) for sending to the VOD controller 206. Likewise, the processors 104 utilize the third and fourth format conversion modules 110c, 110d to respectively convert the notification message from the internal data structure (Int) to the third and fourth formats (C, D) for sending to the HSIA controller 208 and room security controller 210.

At step 310, the processors 104 determine whether the interface gateway 100 expects to receive a confirmation reply after sending the message to the applicable destination. As previously mentioned, some critical messages such as a post room charge message may be required to be confirmed by the destination (e.g., the PMS 202) with an acknowledgement message, whereas other messages such as routine room state updates or a device shutdown messages may not require a confirmation reply. The determination of whether the interface gateway 100 expects to receive a confirmation reply may be determined according to the type of message and the corresponding "Reply required" value stored in column 606 of the message destination table 112. When a reply is expected, control proceeds to step 312; otherwise, control proceeds to step 314.

At step 312, the processors 104 record the message as persistent until a confirmation reply is received. This action ensures the processors 104 will not erase the message from the transmit queue 116 until either the proper confirmation reply is received or a reply timeout occurs.

At step 314, the processors 104 queue the message in the destination format for transmission to the applicable destination by adding the message in the destination format to the transmit queue 116.

FIG. 7 illustrates an example of the transmit queue 116. In this example, pending messages are listed in rows of the transmit queue 116 with columns of message-specific details including:

Column 700—Message: Stores a description of the message to be sent for illustration purposes. Note that in actual implementations this column may store the actual data of the outgoing message as formatted in the destination format, for example, a string of bytes to send to the destination via the appropriate communication port 102.

Column 702—Source: When the interface gateway 100 converts a received message to a format supported by an applicable destination, this column stores an identifier of the source device from which the message originated. When the interface gateway 100 generates a message on behalf of another device such as may occur when the interface gateway replies to a message on behalf of the PMS by using information stored in the state data 108, this column stores an identifier of the device for which the interface gateway 100 is replying on behalf of. Taking the last illustrated message row of FIG. 7 as an example, the interface gateway 100 may have previously received a message from the VOD controller 206 requesting information (e.g., the name of the guest in room 401) from the PMS 202. Because the state data 108 may already contain a cached version of this data, the interface gateway 100 may reply to the VOD controller 206 on behalf of the PMS 202. In this situation, the gateway 100 is acting as the source on behalf of another device (i.e., the PMS 202).

Column 704—Destination: Stores an indication of the destination of the message.

Column 706—Message ID: Stores a message identifier utilized to correlate confirmation replies with the message.

Column 708—Confirmation reply expected: Stores an indication of whether a confirmation reply is expected from the destination. Messages that have a value of "NO" stored in this column may be deleted from the transmit queue 116 upon transmission to the destination. Alternatively, messages that have a value of "YES" stored in this column are not deleted by the processors 104 upon transmission to the destination device. Instead, a message requiring a confirmation reply is left in the transmit queue to be periodically resent until a reply is received. For example, with reference to FIG. 3, after receiving the reply message at step 300 and converting the reply message to the internal data structure (Int) at step 302, the processors 104 parse the reply message to determine the message number being acknowledged and then delete the corresponding message from the transmit queue 116 at step 304.

Column 710—Originally sent: Stores a record of when the message was originally sent to the destination device. For messages awaiting a confirmation reply this field may be used by the processors 104 when determining whether the message has timed out due to lack of a confirmation reply within a predetermined time after the original send time.

Column 712—Last sent: Stores a record of when the message was last sent to the destination device. For messages awaiting a confirmation reply this field indicates when the message was last sent and may be used by the processors 104 to retry the message every predetermined number of seconds, for example.

Column 714—Number of retries: Stores a record of how many times the message has been resent to the destination device so far. For messages awaiting a confirmation reply this field may be used by the processors 104 when determining whether the message has timed out due to lack of a confirmation reply before a maximum number of retries has been exceeded, for example.

Continuing the description of the flowchart of FIG. 3, at step 316 the processors 104 determine whether the received message requires a reply. For some messages, the interface gateway 100 may reply directly to the source device. For example, when receiving a request from the VOD controller 206 for the name of a guest in a particular room 212*a*, the interface gateway 100 may check internal state data 108 at step 306 and when the requested information is cached determine not to forward the message to the PMS 202 at step 306. Instead, the processors 104 may determine at step 316 to reply to the VOD controller 206 on behalf of the PMS 202. A reply may also be determined required at this step when the interface gateway 100 is to confirm receipt of a received message. If the message requires a reply from the interface gateway 100, control proceeds to step 318; otherwise control proceeds to step 326.

At step 318, the processors 104 generate the reply message in the internal data structure. For example, at this step the processors 104 may form a response message in the internal data structure (Int) containing information gathered from the state data 108 in the storage device 106. Other types of reply messages may also be generated at this step such as a confirmation of receipt message, for example. The reply message may include specified information and fields as specified in the request (e.g., as requested in the original incoming message received at step 300).

At step 320, the processors 104 convert the reply message from the internal data structure (Int) to the destination format as looked up in the device format table 114 using the corresponding format conversion module 110. In most cases, the device to which the reply is sent will be the source device and therefore the reply message will be converted from the internal data structure (Int) to the source format utilizing the same format conversion module 110 that was utilized at step 302.

At step 322, the processors 104 queue for transmission the reply message to the source device by adding the resulting reply message as converted at step 320 to the transmit queue 116.

At step 324, the processors 104 take no further action for received messages that neither require the interface gateway 100 to send the message to another destination at step 306 nor to reply to the message at step 316.

Figure 8:
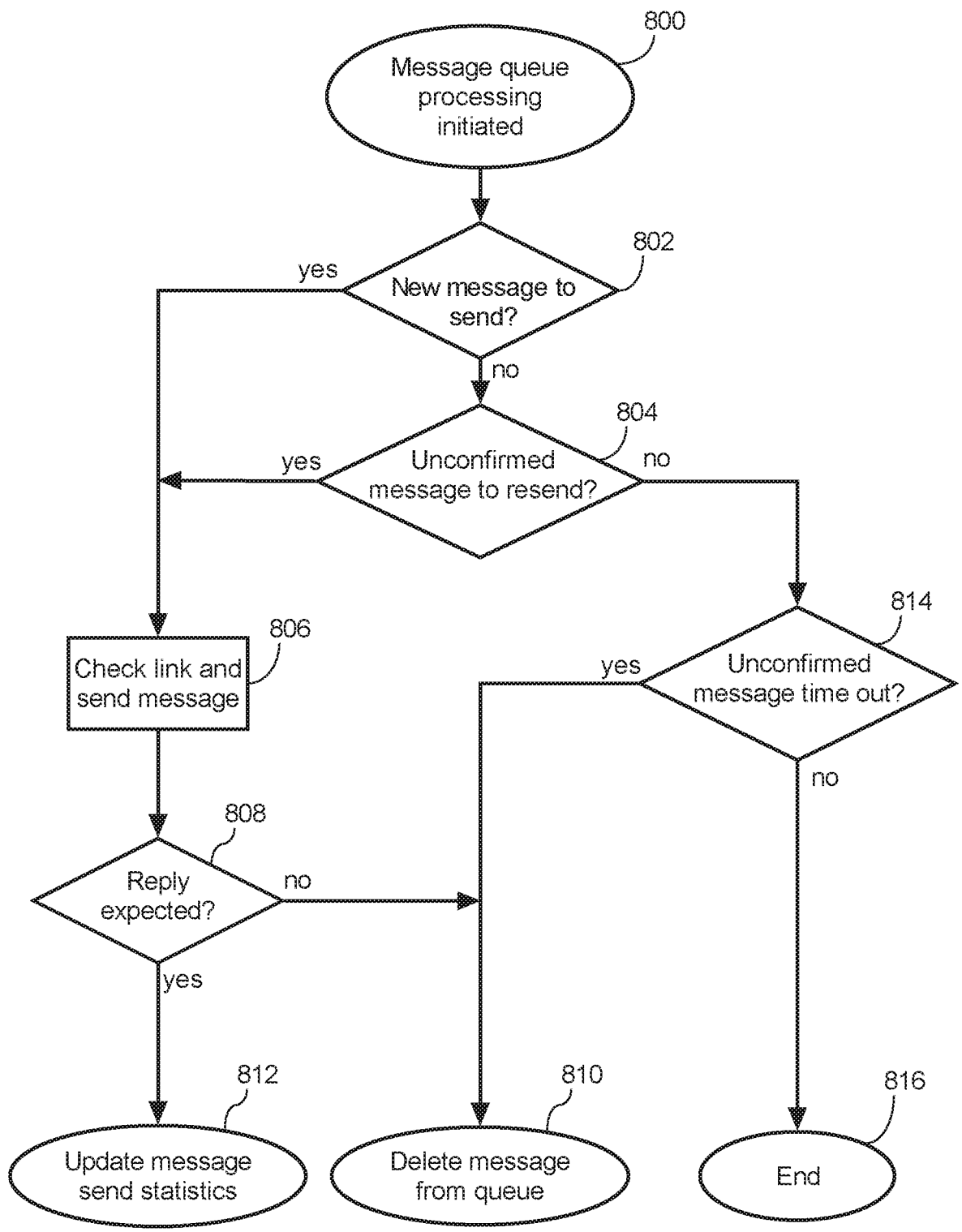
FIG. 8 shows an example of how the interface gateway of FIG. 1 processes outgoing messages stored in the transmit queue according to an exemplary configuration of the invention.

FIG. 8 shows an example of how the interface gateway 100 may process outgoing messages stored in the transmit queue 116. The steps of the flowchart are not restricted to the exact order shown, and, in other configurations, shown steps may be omitted or other intermediate steps added. In this configuration, the processors 104 are configured by executing software instructions (not shown) to perform the steps of FIG. 8.

The process begins at step 800 when the processors 104 initiate message queue processing. This may occur periodically when the transmit queue 116 has at least one pending message, for example.

At step 802, the processors 104 determine whether there a new message to send. In this configuration, "new message" refers to a message that has not yet been sent such as a message having "N/A" stored in the "Originally sent" column 710 of the transmit queue 116 of FIG. 7. When there is a new message to send, control proceeds to step 806; otherwise, control proceeds to step 804.

At step 804, the processors 104 determine whether there is an unconfirmed message to resend. This may happen where the interface gateway 100 recorded the message as persistent at step 312 of FIG. 3 but no confirmation reply has yet been received. In one example, messages expecting a confirmation reply are resent every fifteen seconds until either a confirmation reply is received or a timeout threshold is reached. An unconfirmed message may therefore be determined by the processors 104 searching for a pending message in the transmit queue 116 having a "Last sent" 712 value being greater than fifteen seconds. If there is an unconfirmed message ready to be resent, control proceeds to step 806; otherwise, control proceeds to step 814.

At step 806, the processors 104 check the communication link to the destination device specified in column 704 of the message transmit queue 116 to ensure the link is operating correctly and transmit the message to the destination via the communication port specified in column 402 of FIG. 4 when the link is functional.

At step 808, the processors 104 determine whether a confirmation reply is expected. This will be the case when the processors 104 previously recorded the message as persistent at step 312 of FIG. 3 (which will also be indicated in column 708 of the transmit queue 116). If no reply is expected, control proceeds to step 810; otherwise, control proceeds to step 812.

At step 810, the processors 104 remove the message from the message transmit queue 116.

At step 812, because a confirmation reply is expected, the processors 104 do not remove the message from the message transmit queue 116 and instead update the message send statistics by recording the original message send time (column 710), last message sent time (column 712), and/or the number of retries (column 714). These statistics may be used later to determine when to resend the message or when to timeout if no confirmation reply is received.

At step 814, the processors 104 determine whether there is an unconfirmed message that has timed out. Timeout in this example occurs one minute after the message was originally sent. The processors 104 may therefore search the transmit queue 116 to determine whether any pending messages have an "Originally sent" value in column 710 being greater than one minute from the current time. Other timeout conditions such as after a threshold number of retries (column 714) could also be used in other configurations. If there is an unconfirmed message that has timed out, control proceeds to step 810 to remove the timed out message from the queue 116; otherwise, control proceeds to step 816.

At step 814, this iteration of outgoing message processing ends.

Figure 9:
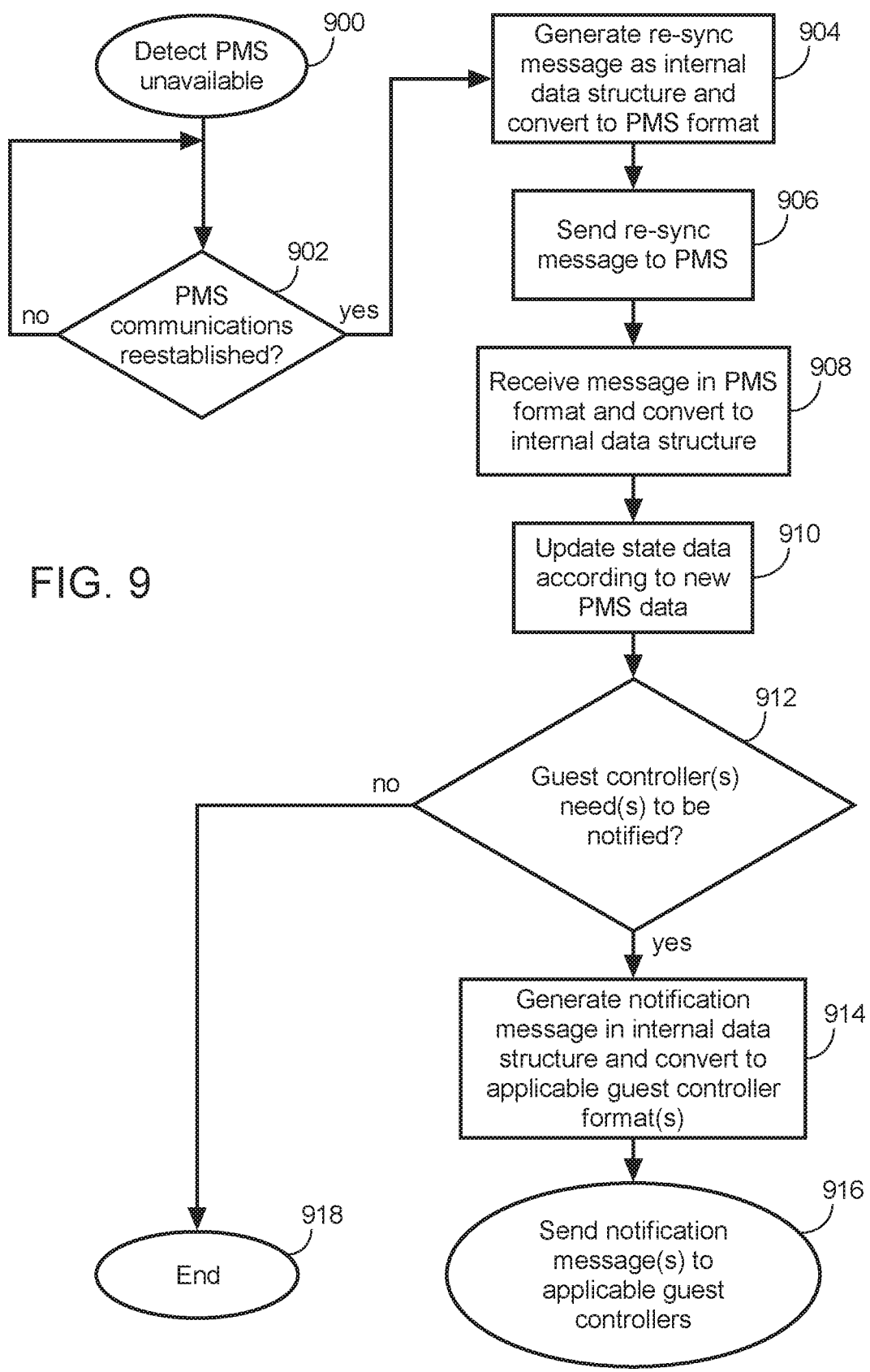
FIG. 9 illustrates a flowchart describing exemplary operations performed by the interface gateway in the system of FIG. 2 when detecting communications with the PMS are no longer possible.

FIG. 9 illustrates a flowchart describing exemplary operations performed by the interface gateway 100 when detecting communications with the PMS 202 are no longer possible. The steps of the flowchart are not restricted to the exact order shown, and, in other configurations, shown steps may be omitted or other intermediate steps added. A similar process may also be performed by the interface gateway 100 in other configurations when detecting communications with other attached devices are no longer possible. In this configuration, the processors 104 are configured by executing software instructions (not shown) to perform the steps of FIG. 9.

The process begins at step 900 when the processors 104 determine that communication with the PMS 202 is no longer possible. This may be done in a number of ways including by periodically sending a ping or other test message to the PMS 202 via the communication port(s) 102 coupled to the PMS 202. The processors 104 may determine communication with the PMS 202 to no longer be available when not receiving a reply to a threshold number of ping or test messages. In another example, the processors 104 may detect that the number of pending messages having the "Destination" column 704 in the transmit queue 116 equal to the PMS 202 to have exceeded a predetermined threshold number of messages. In yet another example, the processors 104 may determine communication with the PMS 202 to no longer be possible after deleting due to timeout a predetermined number of pending messages from transmit queue 116 having the "Destination" column 704 being equal to the PMS 202.

At step 902, the processors 104 determine whether communication with the PMS 202 has been reestablished. For example, the communication with the PMS 202 may be determined to have been reestablished when receiving a reply from the PMS 202 to the ping or tests messages, receiving a replies to another message sent to the PMS 202 on behalf of one of the guest service devices 206, 208, 210, or when receiving any other message from the PMS 202. When communication with the PMS 202 has been reestablished, control proceeds to step 904; otherwise, the process remains at this step to continue monitoring for communication to be reestablished.

At step 904, the processors 104 generate a re-synchronization request message to the PMS 202. Similar to as previously described, this is done by first generating the message in the internal data structure (Int), and then utilizing the appropriate format conversion module 110 to convert the re-synchronization message from the internal data structure (Int) to the message format utilized by the PMS 202, which in this example is format (A) as specified by the device format table 114 of FIG. 4.

At step 906, the processors 104 send the re-synchronization message in the message format (A) of the PMS 202 to the PMS 202 via the one or more communication ports 102. The appropriate communication port and any required addressing details of the PMS 202 may also be retrieved by the processors 104 from the device format table 114. Sending the re-synchronization message at this step may involve adding the message to the transmit queue 116.

At step 908, the processors 104 receive a response message in the format utilized by the PMS 202 and utilize the appropriate format conversion module 110 to convert the response message from the PMS format to the internal data structure (Int). The message format of the incoming message received at this step may be determined by the processors 102 first determining that the message is from the PMS 202 and then retrieving the message format utilized by the PMS 202 from the device format table 114. In this example, the PMS 202 utilized the first format (A) and therefore the processors 104 utilize the first format conversion module 110a to convert the response message from the first format (A) to the internal data structure (Int).

At step 910, the processors 104 parse the response message in the internal data structure (Int) to determine new PMS data included in the response message and update the state data 108 in the storage device 106 according to the new PMS data. For example, when the new PMS data includes a different occupancy state, guest name, or special announcement for one or more guest rooms, the processors 104 update the corresponding rows and columns to cache the room information illustrated in the state data 108 of FIG. 4. In this way, the processors 104 resynchronize the state data 108 in the storage device 106 by requesting the new PMS data from the PMS via the one or more communication ports in response to communication with the PMS being reestablished.

After resynchronizing at least a portion of the state data 108 in the storage device 106, at step 912 the processors 104 determine from the state data 108 in the storage device 106 whether the new PMS data is applicable to an attached device such as one or more of the guest service devices 206, 208, 210. This may be done by examining the data that was changed in the state data 108 in order to determine whether that data is of interest to one or more guest service devices 206, 208, 210. For example, when a guest's name in column 404 of the state data 108 is changed, the processors 104 may determine that a notification message needs to be sent to the VOD controller 206 so that the a STB 216 in the guest's room may be updated to display a new guest's name. The storage device 106 may further store another table (not shown) similar to the message destination table 112 that indicates applicable destination devices when various rows of the state data 108 are changed.

At step 914, the processors 104 generate the notification message in the internal data structure and then utilize the appropriate format conversion module 110 to convert the notification message from the internal data structure (Int) to the format utilized by the destination guest controller. The destination format may be retrieved by the processors from the device format table 114.

At step 916, the processors 104 send the notification message in the format of the destination guest service device. For example, this may be done by the processors 104 adding the message to the transmit queue 116.

At step 918, the process ends as no guest controllers 206, 208, 210 need to be notified of the change in the state data 108. This may be the case when the guest service controllers 206, 208, 210 are configured to actively request certain information from the PMS 202 rather than accept notification messages from the PMS 202.

Figure 10:
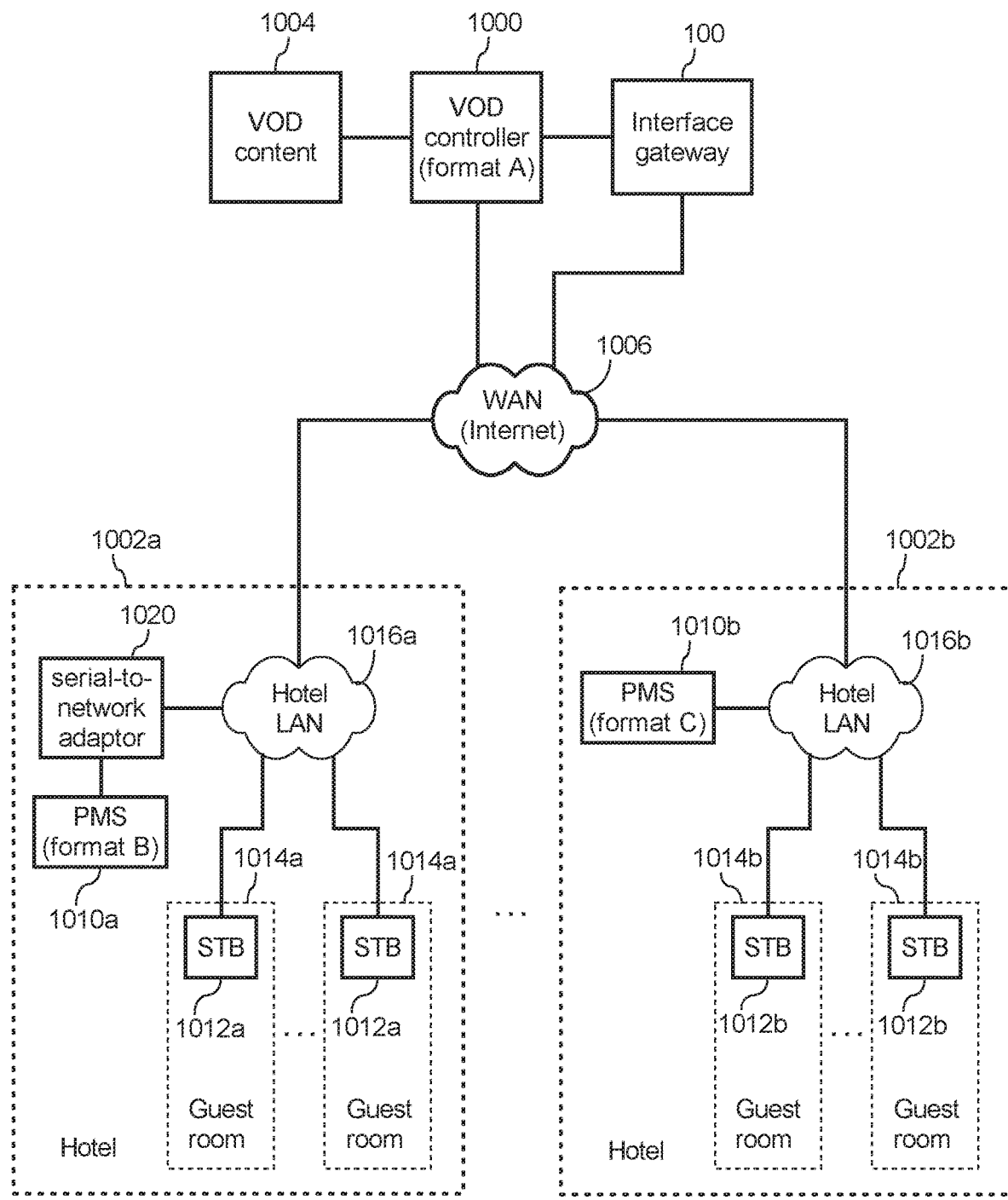
FIG. 10 is a system diagram illustrating a beneficial application of the interface gateway of FIG. 1 to integrate between a central guest service device serving a plurality hospitality establishments according to an exemplary configuration of the invention.

FIG. 10 is a system diagram illustrating a beneficial application of the interface gateway 100 to integrate between a central guest service device such as a central VOD controller 1000 serving a plurality hospitality establishments such as hotels 1002 according to an exemplary configuration of the invention. The system includes the interface gateway 100 coupled to the central VOD controller 1000. Such a central VOD controller 1000 may be useful to provide VOD content 1004 from a central location to the different hotels 1002 via a WAN such as the Internet 1006, which may utilize a software as a service (SaaS) delivery model. In another example, rather than different hotels, the dotted blocks of FIG. 10 indicated with reference numerals 1002a, 1002b may instead be different towers or buildings of a single resort or hotel property.

The first and second hotels 1002a, 1002b respectively include a local PMS 1010a, 1010b coupled to STBs 1012a, 1012b in guest rooms 1014a, 1014b via the hotel's LAN 1016a, 1016b.

Coupled between the first PMS 1010a and the first hotel's LAN 1016a is a serial-to-network adaptor 1020. Rather than (or in addition to) providing for serial PMS links directly at the interface gateway 100, a serial-to-network converter 1020 may be included at any PMS 1010a that includes a serial interface. In this way, the interface gateway 100 may only need to support network-type communication ports and may be located either local or remote to each hospitality establishment. A further benefit is that redundancy of the interface gateway 100 is facilitated by not having to directly support serial cable connections between the gateway and each PMS. Instead, the serial-to-network interface may be a standalone and robust hardware solution that essentially becomes part of the PMS network link. Should a first interface gateway 100 fail, the PMS is still connected to the network and a second interface gateway 100 may automatically take over without requiring any cabling changes at the PMS 1010a. In this way, the adaptor 1020 beneficially allows a serial-port-only PMS 1010a to be coupled to a network 1016a by acting as a network server on the hotel LAN 1016a side and acting as a serial server on the PMS 1010a side.

For illustration purposes, the central VOD controller 1000 operates utilizing a first message format (A), the PMS 1010a at the first hospitality property 1002a operates utilizing a second message format (B), and the PMS 1010b at the second hospitality property 1002b operates utilizing a third message format (C). In this example, the three formats A, B, C are assumed to be different and incompatible.

The system shown in FIG. 10 beneficially allows hospitality establishments such as hotels 1002 to integrate their already installed PMSs 1010 with a centrally provided VOD system 1000, 1004 by installing Internet-coupled STBs 1012 in each guest rooms 1014. If the hotels 1002 already have Internet-coupled STBs 1012, no additional hardware may be required. Additionally, neither of the various PMS vendors nor the VOD system vendor needs to modify their product to support a particular message format because the interface gateway 100 beneficially converts messages between the various incompatible formats A, B, C.

In a usage example, when the PMS 1010a at the first hotel 1002a sends a notification message indicating that a new guest has checked in to a particular guest room 1012a of the first hotel 1002a, the interface gateway 100 receives the notification message via a communication port 102 coupled to the Internet 1006. The processors 104 determine the format of the notification message to be the second format (B) and therefore utilize the second format conversion module 110b to convert the notification message from the second format (B) utilized by the PMS 1010a to the internal data structure (Int). The processors 104 then parse the notification message in the internal data structure (Int) to determine that the notification message is applicable to the VOD controller 1000. The processors 104 then utilize the first format conversion module 110a to convert the notification message from the internal data structure (Int) to the first format (A) as this is the message format utilized by the VOD controller 1000. The processors 104 then send the notification message in the first format (A) to the VOD controller 1000 via the appropriate communication port 102 (e.g., coupled to either the Internet 1006 or another direct communication link). In this way, the VOD controller 1000 receives the notification message and can unlock VOD functionality on an in-room STB 1012a of the particular guest room 1014a specified in the notification message. The guest's name or another guest-specific welcome message may also be displayed on the in-room STB 1012a according to information in the notification message.

In an opposite direction, when a guest in the particular guest room 1012a of the first hotel 1002a orders a movie on the in-room STB 1012a, the STB 1012a sends an order message to the VOD controller 1000 via the Internet 1006. As the STB 1012 is already compatible with the VOD system 1000, 1004 (i.e., because both are provided by the same vendor), there is no message incompatibility problem with the order message and the VOD controller 1000 receives the order message and activates playback of VOD content 1004 on the STB 1012a in the particular guest room 1012a in response to the order message. The VOD controller 1000 then sends a room charge message in the first format (A) to the interface gateway 100 utilizing either a serial or network data communications.

At the interface gateway 100, the processors 104 receive the room charge message via one of the communication ports 102 and determine the room charge message to be in the first format (A). The processors 104 therefore utilize the first format conversion module 110a to convert the room charge message from the first format (A) to the internal data structure (Int). The processors 104 then parse the room charge message in the internal data structure (Int) to determine that the room charge message is applicable to the PMS 1010a at the first hotel 1002a. The processors 104 then utilize the second format conversion module 110b to convert the room charge message from the internal data structure (Int) to the second format (B) as this is the format utilized by the PMS 1010a at the first hotel 1002a. The processors 104 then send the room charge message in the second format (B) to the PMS 1010b via the Internet 1006 and the serial-to-network adaptor 1020. In this way, the room charge message is added to the guest's folio for the particular guest room 1012a in response to the guest ordering a VOD movie.

Figure 11:
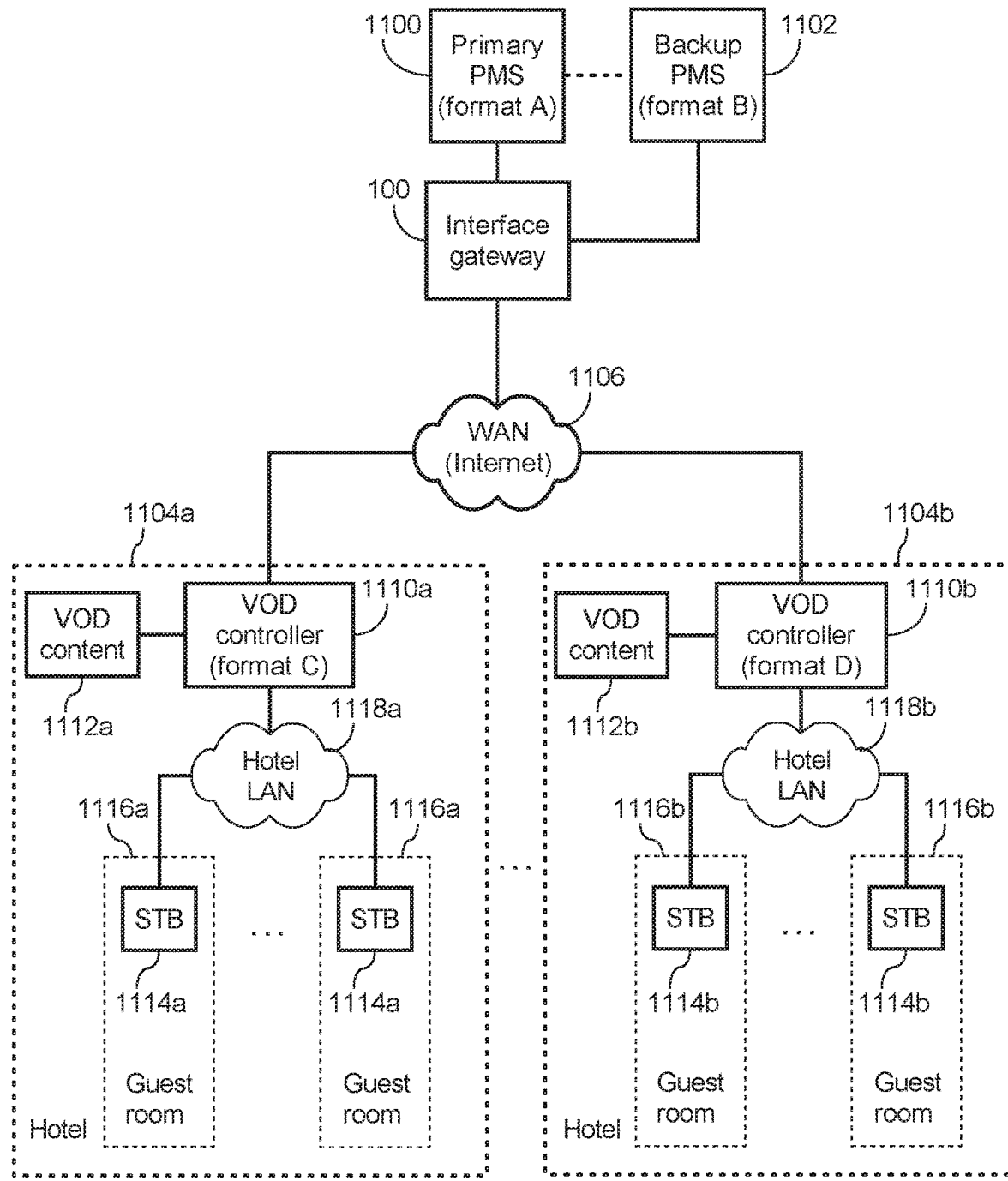
FIG. 11 is a system diagram illustrating a beneficial application of the interface gateway of FIG. 1 to integrate between a plurality of PMSs serving multiple hospitality establishments according to an exemplary configuration of the invention.

FIG. 11 is a system diagram illustrating a beneficial application of the interface gateway 100 to integrate between a plurality of PMSs 1100, 1102 serving multiple hospitality establishments such as hotels 1104 according to an exemplary configuration of the invention. In this example, the system includes the interface gateway 100 coupled to a primary PMS 1100 and a backup PMS 1102. The redundancy of the PMSs 1100, 1002 provides high availability. This configuration may be useful when a single entity such as a hotel chain centrally manages a number of hotels 1104 using a common PMS. In another example, rather than different hotels, the dotted blocks of FIG. 11 indicated with reference numerals 1104a, 1104b may instead be different towers of a single resort or hotel property that are managed using a common PMS.

As shown in FIG. 11, the first and second hotels 1104a, 1104b respectively include a local VOD controller 1110a, 1110b for streaming VOD content 1112a, 1112b to STBs 1114a, 1114b in guest rooms 1116a, 1116b via the hotel's LAN 1118a, 1118b.

For illustration purposes, the primary PMS 1100 operates utilizing a first message format (A), the backup PMS 1102 operates utilizing a second message format (B), the VOD controller 1110a at the first hotel 1104a operates utilizing a third message format (C), and the VOD controller 1110b at the second hotel 1104b operates utilizing a fourth message format (D). In this example, the four formats A, B, C, D are assumed to be different and incompatible.

The system shown in FIG. 11 beneficially allows multiple hotels 1104a to share a central PMS 1100, 1102 while still having one or more locally installed guest service devices, for example, the VOD controller 1110a at the first hotel 1104a and the VOD controller 1110b at the second hotel 1104b. By using locally installed VOD controllers 1110a, 1110b, unlike the centralized VOD system of FIG. 10, should one of the hotels' 1104 connection with the Internet 1106 become unavailable, movies that were already purchased and streaming within the hotels 1104a, 1104b continue to play unaffected. New VOD content 1112a, 1112b may also be streamed to the in-room STBs 1114a, 1114b while the Internet 1105 connection is down because the VOD content 1112a, 1112b is stored local to the hotel 1104a, 1104b. The various PMS 1100, 1102 vendors and the VOD system 1110 vendors do not need to modify their products to support a particular message format because the interface gateway 100 beneficially converts messages between the various incompatible formats A, B, C, D.

In a usage example, when the primary PMS 1100 sends a notification message indicating that a new guest has checked in to a particular guest room 1116a of the first hotel 1104a, the processors 104 of the interface gateway 100 receive the notification message via a communication port 102 coupled to the Internet 1106 and determine that it is in the first format (A) utilized by the primary PMS 1100. The processors 104 utilize the first format conversion module 110a to convert the notification message from the first format (A) to the internal data structure (Int). The processors 104 then parse the notification message in the internal data structure (Int) to determine that the notification message is applicable to the VOD controller 1110a at the first hotel 1104a. The processors 104 then utilize the third format conversion module 110c to convert the notification message from the internal data structure (Int) to the third format (C) as this is the message format utilized by the VOD controller 1110a at the first hotel 1104a. The processors 104 then send the notification message in the first format (A) to the VOD controller 1110a via the appropriate communication port 102 (e.g., coupled to either the Internet 1106). In this way, the VOD controller 1110a at the first hotel 1104a receives the notification message and can unlock VOD functionality on an in-room STB 1114a of the particular guest room 1116a specified in the notification message. The guest's name or another guest-specific welcome message may also be displayed on the in-room STB 1114a according to information in the notification message.

In an opposite direction, when a guest in a particular guest room 1116a of the first hotel 1104a orders a movie on their in-room STB 1114a, the STB 1114a sends an order message to the local VOD controller 1110a via the hotel's LAN 1118a. As the VOD system is provided by the same vendor, there is no message incompatibility problem with the order message and the VOD controller 1111a receives the order message and activates the playback of VOD content 1112a on the STB 1114a in the particular guest room 1116a in response to the order message. The VOD controller 1110a then sends a room charge message in the third format (C) to the interface gateway 100 via the Internet 1106.

At the interface gateway 100, the processors 104 receive the room charge message via a communication port 102 coupled to the Internet 1106 and determine that the message is in the third format (C) utilized by the VOD controller 1110a at the first hotel 1104a. The processors 104 utilize the third format conversion module 110c to convert the room charge message from the third format (C) to the internal data structure (Int). The processors 104 then parse the room charge message in the internal data structure (Int) to determine that the room charge message is applicable to the primary PMS 1100. The processors 104 then utilize the first format conversion module 110a to convert the room charge message from the internal data structure (Int) to the first format (A) as this is the message format utilized by the primary PMS 1100. The processors 104 then send the room charge message in the first format (A) to the primary PMS 1100 via a communication port 102 coupled to the primary PMS 1100. In this way, the room charge message is added to the guest's folio for the particular guest room 1116a at the first hotel 1104a in response to the guest ordering a VOD movie.

Concerning the backup PMS 1102, the processors 104 of the interface gateway 100 may parse the above-described room charge message in the internal data structure (Int) to determine that the room charge message is also applicable to the backup PMS 1102. The processors 104 then utilize the second format conversion module 110b to convert the room charge message from the internal data structure (Int) to the second format (B) as this is the format utilized by the backup PMS 1102. The processors 104 then send the room charge message in the second format (B) to the backup PMS 1102 via a communication port 102 coupled to the backup PMS 1102. In this way, both the primary PMS 1100 and backup PMS 1102 are sent the room charge message.

Should the interface gateway 100 detect that communication with the primary PMS 1100 is no longer available, for example, using methods similar to as described in conjunction with step 900 of FIG. 9, the interface gateway 100 may direct requests for PMS information received from the VOD controllers 1206 to the backup PMS 1102. In this way, regardless of a failure of the primary PMS 1102, the VOD controllers 1110 will still be able to receive information from the backup PMS 1102. Additionally, because the interface gateway 100 automatically performs message format conversion there is no need to modify the VOD controllers 1110 to support the second message format (B) utilized by the backup PMS 1102. The interface gateway 100 may also include load balancing functionality to alternatively route and or distribute messages received from the VOD controllers 1110 between the primary PMS 1100 and the backup PMS 1102. This configuration is particularly beneficial when the primary PMS 1100 and backup PMS 1102 already have a data replication channel between them such as illustrated by the dotted line between PMSs 1100, 1102 in FIG. 11.

Figure 12:
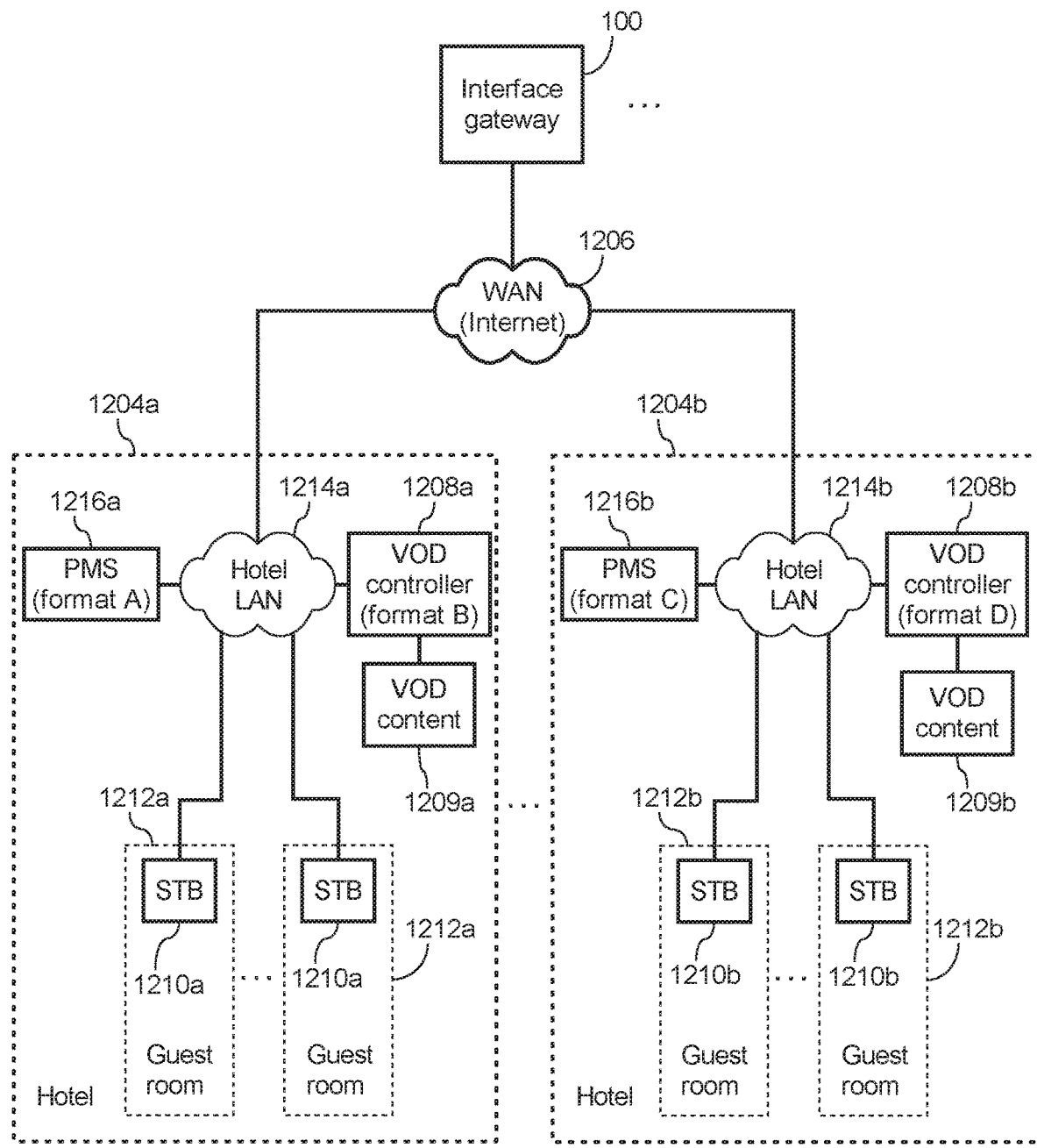
FIG. 12 is a system diagram illustrating a beneficial application of utilizing a centrally located interface gateway of FIG. 1 to integrate between a respective PMS and guest service device locally-installed at a plurality of hospitality establishments according to an exemplary configuration of the invention.

FIG. 12 is a system diagram illustrating a beneficial application of utilizing a centrally located interface gateway 100 to integrate between a PMS 1200 and VOD controller 1202 pair locally-installed at a plurality of hospitality establishments such as hotels 1204. In this example, the system includes the interface gateway 100 coupled to the different hospitality establishments 1204 via a WAN such as the Internet 1206. Each hotel 1204a, 1204b respectively includes its own local VOD controller 1208a, 1208b for serving VOD content 1209a, 1209b to STBs 1210a, 1210b installed in guest rooms 1212a, 1212b via a LAN 1214a, 1214b. Each hotel 1204a, 1204b also respectively includes its own PMS 1216a, 1216b coupled to the Internet 1206 via the hotel's LAN 1214a, 1214b. In another example, rather than different hotels, the dotted blocks of FIG. 12 indicated with reference numerals 1204a, 1204b may instead be different towers of a single resort or hotel property.

For illustration purposes, the PMS 1216a at the first hotel 1204a operates utilizing a first message format (A) and the VOD controller 1208a at the first hotel 1204a operates utilizing a second message format (B). At the second hotel 1204b, the PMS 1216b operates utilizing a third message format (C) and the VOD controller 1208b operates utilizing a fourth message format (D). In this example, the four formats A, B, C, D are assumed to be different and incompatible.

The system shown in FIG. 12 beneficially allows multiple hotels 1204 to integrate a locally installed PMS 1216 with a locally installed guest service device such as VOD controller 1208 without installing any additional equipment at the hotel 1204 or requiring vendors of the PMS 1216 or the VOD controller 1208 to modify their components to support a particular message format. The interface gateway 100 beneficially converts messages between the various incompatible formats A, B, C, D.

In a usage example, when the PMS 1216a at the first hotel 1204a sends a notification message indicating that a new guest has checked in to a particular guest room 1212a of the first hotel 1204a, the interface gateway 100 receives the notification message via a communication port 102 coupled to the Internet 1206. The processors 104 determine that the received message is in the first format(A) utilized by the PMS 1216a and utilize the first format conversion module 110a to convert the notification message from the first format (A) to the internal data structure (Int). The processors 104 then parse the notification message in the internal data structure (Int) to determine that the notification message is applicable to the VOD controller 1208a at the first hotel 1204a. The processors 104 then utilize the second format conversion module 110b to convert the notification message from the internal data structure (Int) to the second format (B) as this is the format utilized by the VOD controller 1208a at the first hotel 1204a. The processors 104 then send the notification message in the second format (B) to the VOD controller 1208a at the first hotel 1204a via a communication port 102 coupled to the Internet 1206.

As illustrated in the above example, when receiving a PMS message applicable to a guest service device such as one of the VOD controllers 1208, the processors 104 select the guest service device (e.g., VOD controller 1208a) from a plurality of guest service devices (e.g., VOD controllers 1208a, 1208b) such that the selected guest service device serves a same hotel 1204 as the PMS 1216 from which the message originated. In this way, upon guest check-in, the VOD controller 1208a at the first hotel 1204a receives the notification message and can unlock VOD functionality on an in-room STB 1210a of the particular guest room 1212a specified in the notification message. The guest's name or another guest-specific welcome message may also be displayed on the in-room STB 1210a according to information in the notification message.

In an opposite direction, when a guest in a particular guest room 1212a of the first hotel 1204a orders a movie on their in-room STB 1210a, the STB 1210a sends an order message to the local VOD controller 1208a via the hotel's LAN 1214a. As the VOD system is provided by the same vendor, there is no message incompatibility problem with the order message and the VOD controller 1208a receives the order message and activates the playback of VOD content 1209a on the STB 1210a in the particular guest room 1212a in response to the order message. The VOD controller 1208a then sends a room charge message in the second format (B) to the interface gateway 100 via the hotel LAN 1214a and the Internet 1106.

At the interface gateway 100, the processors 104 receive the room charge message via a communication port 102 coupled to the Internet 1206 and determine that it is in the second format (B) utilized by the VOD controller 1208a. The processors 104 therefore utilize the second format conversion module 110b to convert the room charge message from the second format (B) to the internal data structure (Int). The processors 104 then parse the room charge message in the internal data structure (Int) to determine that the room charge message is applicable to the PMS 1216a at the first hotel 1204a. The processors 104 then determine that this destination device utilizes the first format (A) and utilize the first format conversion module 110a to convert the room charge message from the internal data structure (Int) to the first format (A). The processors 104 then send the room charge message in the first format (A) to the PMS 1216b via the Internet 1206. In this way, the room charge message is added to the guest's folio for the particular guest room 1212a in response to the guest ordering a VOD movie. Similar processes are utilized when passing messages between the PMS 1216b and VOD controller 1208b at second hotel 1204b.

In an example configuration, the interface gateway 100 handles replying to and generating messages in response to certain events on its own and thereby reduces load on the PMS while also increasing overall efficiency and performance of a system employing the interface gateway 100. For example, the interface gateway 100 may automatically ensure all applicable guest service devices are kept appraised of changes to the state data 108 without requiring active involvement of the PMS. Furthermore, even in the event that both a guest service device and a PMS utilize a same message format, the interface gateway 100 may still convert messages received from one into the internal data structure (Int) before converting back to the original external format to pass to the other in order to obtain the above-described benefits from processing the received message in the internal data structure (Int). For example, by processing the message in the internal data structure (Int), the interface gateway may update the state data 108 in the storage device 106 and reply to future requests for the same information without involving the PMS.

In another configuration, the interface gateway 100 also offers a common application programming interface (API) allowing PMSs and/or guest service devices that support the common API to directly interface with the interface gateway 100. The common API may be considered as a particular message format and one of the format conversion modules 110 installed in the storage device 106 may be directed at the common API to thereby allow conversion of messages utilizing the common API into and out of the internal data structure (Int).

As shown in FIGS. 10-12, rather than locating the interface gateway 100 at the hotel property, the interface gateway 100 may be located in the cloud such as at an offsite location accessible by a computer network (e.g., the Internet). When used in a cloud solution, the gateway 100 may beneficially handle PMS integration between guest service devices and PMSs at a plurality of different hospitality establishments such as hotels. In this case, the storage data 106 further store tables and/or information used to correlate guest service device(s) serving a particular hospitality establishment to the appropriate PMS(s) serving the same hospitality establishment and vice versa. When receiving an incoming message from a source device (e.g., PMS) that is applicable to a certain type of destination device (e.g., VOD controller), the one or more processors 104 select the destination device of this type from the plurality of attached devices such that the selected destination device serves a same hospitality establishment as the source device. This beneficially allows a single interface gateway 100 to interface between additional property management systems and guest service devices serving other hospitality establishments while ensuring that messages are only forwarded between attached devices that serve a same hospitality establishment. Although FIGS. 10-12 illustrate a single type of guest service device (e.g., VOD controllers), the same systems are also applicable to other types of guest service devices.

A cluster of multiple interface gateways 100 may be employed for a single hotel or other hospitality establishment such that if one gateway 100 should fail for whatever reason, a second gateway 100 will continue to operate and guest service systems at the hotel will continue to operate. For example, a VOD controller or PMS may timeout when sending a first message to a primary gateway 100 that has failed; however, on second try of sending the same message, a redundant, secondary gateway 100 may take over for the primary. More sophisticated designs using load sharing may prevent the timeout from occurring when the primary fails by automatically rerouting the request to the backup.

For a cloud based design where the interface gateway 100 is accessible from a public network, security of personal information is a concern. Personal information may be protected by carefully following the payment card industry (PCI) data security standard.

In another advantageous configuration, the interface gateway 100 also dynamically adjusts the content of messages as a part of the format conversion process. For example, a first attached device such as a VOD controller may send a message such as:

"LOOK 113, FN;LN;ACCT;DAmm/dd/yyyy"

This example message means the VOD controller wants the guest's first name (FN), last name (LN), ACCT number, and checkin date DA in a certain representation (mm/dd/yyyy) for room #113. The interface gateway 100 receives the message, converts the message to the internal data structure, parses the message to determine it is applicable to a second attached device such as the PMS, determines the message format required by the PMS, and then converts the message from the internal data structure to the format used by the PMS, which may only support a similar but generic message such as:

"LK 113"

In response, the PMS replies with all stored data at the PMS pertaining to room #113, which could include extra information in addition to that requested by the VOD controller, and the information may be represented in different forms like dates in yy/mm/dd, for example. The interface gateway 100 receives the response message from the PMS, converts the response message to the internal data structure, parses the response message in the internal data structure to determine that it is applicable (i.e. a reply) to the VOD controller. The interface gateway 100 then generates a reply message to VOD controller using only the fields of the internal data structure that OVM actually requested in its original request (i.e., FN, LN, ACCT, DA in this example) and also puts the fields in their requested representation (such as making sure the DA field is represented as mm/dd/yyyy).

An advantage of this configuration is the various attached devices can be upgraded or changed at any time to request specific information and/or use different representations, and other devices attached to the interface gateway 100 and the interface gateway 100 itself do not need to be modified as long as the interface gateway includes the appropriate format conversion module(s) 110 selected to correspond with the attached devices.

In summary, an example interface gateway interfaces between a first device and a second device serving a hospitality establishment. The first device is one of a property management system (PMS) and a guest service device, and the second device is the other of the property management system (PMS) and the guest service device. One or more communication ports perform data communications with the first device and the second device. One or more processors receive a message from the first device, determine that the message is in a first format, convert the message from the first format to an internal data structure, parse the message in the internal data structure to determine that the message is applicable to the second device, determine that the second device supports a second format, convert the message from the internal data structure to the second format, and send the message in the second format to the second device.

Although the invention has been described in connection with a preferred embodiment, it should be understood that various modifications, additions and alterations may be made to the invention by one skilled in the art without departing from the spirit and scope of the invention as defined in the appended claims. For example, in addition to one or more general purpose and/or specific purpose processors 104, a microcontroller, circuit, or other hardware based implementation technique such as an application specific integrated circuit (ASIC) or field programmable gate array (FPGA) may be utilized to perform the above-described functions of the interface gateway 100. In another example, although software-based format conversion modules 110 are anticipated to be of particular benefit by the inventors, firmware or hardware based format conversion modules 110 may also be employed in other configurations. In another example, the state data 108 may include cached data corresponding to data stored at the guest service devices to thereby reduce load on the guest service devices should the cached data later be requested by the PMS or another device. In other examples, a message may be represented as (i.e., segmented into) a plurality of messages, and a plurality of messages may be combined into a single message. In yet another example, rather than operating as a standalone unit, the interface gateway 100 may be combined with and/or operate as a function of the PMS, one of the guest service devices, or another device such as an Internet gateway or firewall.

Although the invention has been described as being utilized at a hotel, the invention is equally applicable to any hospitality related location or service wishing to integrate guest service devices with property management systems including but not limited to hotels, motels, resorts, hospitals, apartment/townhouse complexes, restaurants, retirement centers, cruise ships, busses, airlines, shopping centers, passenger trains, casinos, etc. The exemplary user of "guest" is utilized in the above description because customers of hospitality establishments are generally referred to as guests; however, the exemplary user of "guest" in conjunction with the invention further includes all types of users whether or not they are customers. The invention is also applicable outside the hospitality industry such as to interface between an attached management system and a number of external control devices having different message format requirements at a factory. In another example, the interface gateway of the invention may be employed to interface between attached digital signage devices having different message format requirements.

The various separate elements and modules of the invention described above may be integrated or combined into single units. Similarly, functions of single elements and modules may be separated into multiple units. The flowcharts may be implemented as processes executed by dedicated hardware, and may also be implemented as one or more software programs executed by a general or specific purpose processor to cause the processor to operate pursuant to the software program to perform the flowchart steps. In this way, a computer-readable medium stores computer executable instructions that when executed by a computer cause the computer to perform above-described actions of the interface gateway 100. Examples of the computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network. For example, the interface gateway 100 of FIG. 2 may be implemented by a computer having one or more processors 104 executing a computer program loaded from a hard drive located within the computer or elsewhere to perform the steps of the various flowcharts and above description. In one configuration, the computer is a computer server connected to a network such as the Internet 234 and the computer program stored in the hard drive may be dynamically updated by the update server 232. In addition to a dedicated physical computing device, the word "server" may also mean a service daemon on a single computer, virtual computer, or shared physical computer, for example. Unless otherwise specified, features described may be implemented in hardware or software according to different design requirements. Additionally, all combinations and permutations of the above described features and configurations may be utilized in conjunction with the invention.

What is claimed is:

1. A method of facilitating communication between a first device and a second device serving a hospitality establishment, the first device being one of a property management system (PMS) and a guest service device, and the second device being the other of the property management system (PMS) and the guest service device, the first device configured to support a first message format that is different than a second message format supported by the second device, the method performed by an interface gateway that utilizes an internal data structure, the method comprising:
storing in a storage device information regarding the first message format and the second message format;
receiving a message from the first device;
determining that the message is in the first message format supported by the first device according to information contained in the storage device;
converting the message from the first message format into the internal data structure;
detecting that the message is designated for the second device according to information contained in the message;
determining that the second device supports the second message format according to information contained in the storage device;
converting the message from the internal data structure into the second message format;
storing the message in the second message format as an outgoing message in a transmit queue, wherein the transmit queue stores one or more outgoing messages and a respective indication of whether the interface gateway is expected to receive a confirmation reply from a destination device to which the outgoing message is associated; and
sending the message in the second message format from the transmit queue to the second device.

2. The method of claim 1, further comprising:
determining that the interface gateway is expected to receive confirmation reply from the second device according to information contained in the message; and
monitoring a communication port on the interface gateway for the confirmation reply.

3. The method of claim 2, further comprising resending the message from the transmit queue to the second device after determining that the confirmation reply is yet to be received by the interface gateway.

4. The method of claim 2, further comprising automatically erasing the message from the transmit queue when the confirmation reply is not received after a predetermined timeout threshold is reached.

5. The method of claim 2, further comprising:
receiving the confirmation reply from the second device via the communication port; and
automatically erasing the message from the transmit queue after determining that the confirmation reply is a response to the message from the first device.

6. The method of claim 1, further comprising:
receiving the confirmation reply from the second device;
converting the confirmation reply into the internal data structure;
parsing the confirmation reply to determine that the confirmation reply is an acknowledgement to the message sent by the first device; and
sending the confirmation reply to the first device.

7. The method of claim 1, further comprising dynamically adjusting the message received from the first device prior to sending to the second device.

8. The method of claim 1, further comprising storing in the storage device a plurality of format conversion modules utilized by the interface gateway in converting messages between an external message format and the internal data structure.

9. The method of claim 8, further comprising:
receiving one or more messages in a new message format that is incompatible with the plurality of format conversion modules; and
prompting an update server that is coupled to the interface gateway to add a new format conversion module to the storage device for converting between the new message format and the internal data structure.

10. The method of claim 1, further comprising:
detecting that communication with the second device is no longer possible;
generating a resynchronization message as internal data structure;
converting the resynchronization message from the internal data structure into the second message format;
sending the resynchronization message in the second message format to the second device;
at a later time, receiving from the second device a response to the resynchronization message, thereby determining that communication with the second device has been reestablished; and
resending the message in the second format to the second device.

11. An interface gateway for facilitating communication between a first device and a second device serving a hospitality establishment, the first device being one of a property management system (PMS) and a guest service device, and the second device being the other of the property management system (PMS) and the guest service device, the first device configured to support a first message format that is different than a second message format supported by the second device, the interface gateway comprising:
one or more communication ports for communicating with the first device and the second device;
a storage device storing a plurality of software instructions utilized by the interface gateway in facilitating communication between the first device and the second device;
one or more processors coupled to the storage device and the one or more communication ports;
wherein, by the one more processors executing the software instructions from the storage device, the one or more processors are operable to:
receive a message from the first device via the one or more communication ports;
determine that the message is in the first message format supported by the first device according to information contained in the storage device;
convert the message from the first message format into an internal data structure utilized by the interface gateway;
detect that the message is designated for the second device according to information contained in the message;
determine that the second device supports the second message format according to information contained in the storage device;
convert the message from the internal data structure into the second message format;
store the message in the second message format as an outgoing message in a transmit queue, wherein the transmit queue stores one or more outgoing messages and a respective indication of whether the interface gateway is expected to receive a confirmation reply from a destination device to which the outgoing message is associated; and
send the message in the second message format from the transmit queue to the second device.

12. The interface gateway of claim 11, wherein the one or more processors are further operable to:
determine that the interface gateway is expected to receive confirmation reply from the second device according to information contained in the message; and
monitor the one or more communication ports for the confirmation reply.

13. The interface gateway of claim 12, wherein the one or more processors are further operable to resend the message from the transmit queue to the second device after determining that the confirmation reply is yet to be received by the interface gateway.

14. The interface gateway of claim 12, wherein the one or more processors are further operable to automatically erase the message from the transmit queue when the confirmation reply is not received after a predetermined timeout threshold is reached.

15. The interface gateway of claim 12, wherein the one or more processors are further operable to:
receive the confirmation reply from the second device via the one or more communication ports; and
automatically erase the message from the transmit queue after determining that the confirmation reply is a response to the message from the first device.

16. The interface gateway of claim 11, wherein the one or more processors are further operable to:
receive the confirmation reply from the second device;
convert the confirmation reply into the internal data structure;
parse the confirmation reply to determine that the confirmation reply is an acknowledgement to the message sent by the first device; and
send the confirmation reply to the first device.

17. The interface gateway of claim 11, wherein the one or more processors are further operable to dynamically adjust the message received from the first device prior to sending to the second device.

18. The interface gateway of claim 11, wherein the storage device further stores a plurality of format conversion modules utilized by the interface gateway in converting messages between an external message format and the internal data structure.

19. The interface gateway of claim 18, wherein the one or more processors are further operable to:
receive one or more messages in a third message format that is incompatible with any of pre-existing format conversion modules stored in the storage device; and
prompt an update server that is coupled to the interface gateway to add to the storage device a format conversion module for converting the one or more messages from the third message format to the internal data structure, the format conversion module being different than pre-existing format conversion modules stored in the storage device.

20. The interface gateway of claim 11, wherein the one or more processors are further operable to:
detect that communication with the second device is no longer possible;
generate a resynchronization message as internal data structure;

convert the resynchronization message from the internal data structure into the second message format;
send the resynchronization message in the second message format to the second device;
at a later time receive from the second device a response to the resynchronization message; and
resend the message in the second format to the second device.

* * * * *